(12) United States Patent
Keilwert et al.

(10) Patent No.: US 10,764,660 B2
(45) Date of Patent: Sep. 1, 2020

(54) ELECTRONIC GAMING MACHINE AND METHOD WITH SELECTABLE SOUND BEAMS

(71) Applicant: IGT, Las Vegas, NV (US)

(72) Inventors: Stefan Keilwert, St. Josef (AT); David Small, Moncton (CA); David Froy, Lakeville-Westmorland (CA); Klaus Achmueller, Kalsdorf bei Graz (AT)

(73) Assignee: IGT, Las Vegas, NV (US)

(*) Notice: Subject to any disclaimer, the term of this patent is extended or adjusted under 35 U.S.C. 154(b) by 100 days.

(21) Appl. No.: 16/053,201

(22) Filed: Aug. 2, 2018

(65) Prior Publication Data

US 2020/0045396 A1    Feb. 6, 2020

(51) Int. Cl.
| | | |
|---|---|---|
| *H04R 1/00* | (2006.01) | |
| *H04R 1/02* | (2006.01) | |
| *G06F 3/01* | (2006.01) | |
| *G07F 17/32* | (2006.01) | |
| *H04R 5/04* | (2006.01) | |
| *H04R 5/02* | (2006.01) | |

(52) U.S. Cl.
CPC ............ *H04R 1/025* (2013.01); *G06F 3/012* (2013.01); *G07F 17/3202* (2013.01); *H04R 5/023* (2013.01); *H04R 5/04* (2013.01)

(58) Field of Classification Search
CPC ......... H04R 3/12; H04R 5/04; G07F 17/3202; G07F 17/3216; G07F 17/3206; G06F 3/012; G06F 3/165; H04S 7/303
See application file for complete search history.

(56) References Cited

U.S. PATENT DOCUMENTS

| | | |
|---|---|---|
| 3,831,172 A | 8/1974 | Olliges et al. |
| 4,339,798 A | 7/1982 | Hedges et al. |
| 4,363,482 A | 12/1982 | Goldfarb |
| 4,496,149 A | 1/1985 | Schwartzberg |
| 4,582,324 A | 4/1986 | Koza et al. |
| 4,618,150 A | 10/1986 | Kimura |
| 4,624,459 A | 11/1986 | Kaufman |

(Continued)

OTHER PUBLICATIONS

Wikipedia, "Binaural recording" available at https://en.wikipedia.org/wiki/binaural_recording, printed on May 14, 2018 (8 pages).

(Continued)

*Primary Examiner* — Matthew A Eason
(74) *Attorney, Agent, or Firm* — Neal, Gerber & Eisenberg LLP

(57) ABSTRACT

An electronic gaming machine and methods of operating an electronic gaming machine that provide selectable sound beams. In various embodiments, the electronic gaming machine includes a housing having a front side, a head position tracker supported by the housing, a first speaker array supported by the housing, and a second speaker array supported by the housing. The first speaker array includes a plurality of independently operable first speakers that are positioned at different angles to direct sound beams at different angles relative to the front side of the housing. The second speaker array includes a plurality of independently operable second speakers that are positioned at different angles to direct sound beams at different angles relative to the front side of the housing.

16 Claims, 12 Drawing Sheets

(56) References Cited

U.S. PATENT DOCUMENTS

| | | | |
|---|---|---|---|
| 4,660,107 A | 4/1987 | Chippendale, Jr. | |
| 4,695,053 A | 9/1987 | Vazquez, Jr. et al. | |
| 4,974,857 A | 12/1990 | Beall et al. | |
| 5,096,195 A | 3/1992 | Gimmon | |
| 5,179,517 A | 1/1993 | Sarbin et al. | |
| 5,221,801 A | 6/1993 | Bruti et al. | |
| 5,242,163 A | 9/1993 | Fulton | |
| 5,275,400 A | 1/1994 | Weingardt et al. | |
| 5,342,047 A | 8/1994 | Heidel et al. | |
| 5,371,345 A | 12/1994 | LeStrange et al. | |
| 5,390,938 A | 2/1995 | Takeya | |
| 5,393,061 A | 2/1995 | Manship et al. | |
| 5,429,507 A | 7/1995 | Kaplan | |
| 5,430,835 A | 7/1995 | Williams et al. | |
| 5,449,173 A | 9/1995 | Thomas et al. | |
| 5,472,197 A | 12/1995 | Gwiasda et al. | |
| 5,668,996 A | 9/1997 | Radinsky | |
| 5,695,188 A | 12/1997 | Ishibashi | |
| 5,697,843 A | 12/1997 | Manship et al. | |
| 5,707,286 A | 1/1998 | Carlson | |
| 5,762,552 A | 6/1998 | Vuong et al. | |
| 5,766,074 A | 6/1998 | Cannon et al. | |
| 5,772,509 A | 6/1998 | Weiss | |
| 5,792,972 A | 8/1998 | Houston | |
| 5,807,172 A | 9/1998 | Piechowiak | |
| 5,833,538 A | 11/1998 | Weiss | |
| 5,839,958 A | 11/1998 | Ozarow | |
| 5,848,932 A | 12/1998 | Adams | |
| 5,876,284 A | 3/1999 | Acres et al. | |
| 5,902,184 A | 5/1999 | Bennett et al. | |
| 5,908,354 A | 6/1999 | Okuniewicz | |
| 5,910,048 A | 6/1999 | Feinberg | |
| 5,967,894 A | 10/1999 | Kinoshita et al. | |
| 5,997,401 A | 12/1999 | Crawford | |
| 6,015,346 A | 1/2000 | Bennett | |
| D421,277 S | 2/2000 | McGahn et al. | |
| 6,056,642 A | 5/2000 | Bennett | |
| 6,062,979 A | 5/2000 | Inoue | |
| 6,071,192 A | 6/2000 | Weiss | |
| 6,084,169 A | 7/2000 | Hasegawa et al. | |
| 6,089,976 A | 7/2000 | Schneider et al. | |
| 6,089,978 A | 7/2000 | Adams | |
| 6,102,400 A | 8/2000 | Scott et al. | |
| 6,106,393 A | 8/2000 | Sunaga et al. | |
| 6,110,041 A | 8/2000 | Walker et al. | |
| 6,110,043 A | 8/2000 | Olsen | |
| 6,113,495 A | 9/2000 | Walker | |
| 6,117,009 A | 9/2000 | Yoseloff | |
| 6,126,165 A | 10/2000 | Sakamoto | |
| 6,142,875 A | 11/2000 | Kodachi et al. | |
| 6,146,273 A | 11/2000 | Olsen | |
| 6,146,276 A | 11/2000 | Okuniewicz | |
| 6,155,925 A | 12/2000 | Giobbi et al. | |
| 6,159,097 A | 12/2000 | Gura | |
| 6,174,233 B1 | 1/2001 | Sunaga et al. | |
| 6,174,235 B1 | 1/2001 | Walker | |
| 6,175,632 B1 | 1/2001 | Marx | |
| 6,217,448 B1 | 4/2001 | Olsen | |
| 6,238,288 B1 | 5/2001 | Walker et al. | |
| 6,241,612 B1 | 6/2001 | Heredia | |
| 6,254,481 B1 | 7/2001 | Jaffe | |
| 6,270,411 B1 | 8/2001 | Gura et al. | |
| 6,302,790 B1 | 10/2001 | Brossard | |
| 6,306,034 B1 | 10/2001 | Sakamoto et al. | |
| 6,309,299 B1 | 10/2001 | Weiss | |
| 6,309,301 B1 | 10/2001 | Sano | |
| 6,328,648 B1 | 12/2001 | Walker et al. | |
| 6,390,923 B1 | 5/2002 | Yoshitomi et al. | |
| 6,409,596 B1 | 6/2002 | Hayashida et al. | |
| 6,416,411 B1 | 7/2002 | Tsukahara | |
| 6,537,152 B2 | 3/2003 | Seelig et al. | |
| 6,544,122 B2 | 4/2003 | Araki et al. | |
| 6,554,703 B1 | 4/2003 | Bussick et al. | |
| 6,561,908 B1 | 5/2003 | Hoke | |
| 6,599,195 B1 | 7/2003 | Araki et al. | |
| 6,638,169 B2 | 10/2003 | Wilder et al. | |
| 6,656,046 B1 | 12/2003 | Yoseloff et al. | |
| 6,729,618 B1 | 5/2004 | Koenig et al. | |
| 6,848,996 B2 | 2/2005 | Hecht et al. | |
| 6,935,955 B1 | 8/2005 | Kaminkow et al. | |
| 6,939,226 B1 | 9/2005 | Joshi | |
| 7,105,736 B2 | 9/2006 | Laakso | |
| 7,258,613 B2 | 8/2007 | Lucchesi et al. | |
| 7,355,112 B2 | 4/2008 | Laakso | |
| 7,367,886 B2 * | 5/2008 | Loose | G07F 17/32 463/20 |
| 7,626,569 B2 * | 12/2009 | Lanier | G06F 1/1601 345/156 |
| 7,666,098 B2 | 2/2010 | Hecht et al. | |
| 7,708,642 B2 | 5/2010 | Hecht et al. | |
| 7,867,085 B2 | 1/2011 | Pryzby et al. | |
| 7,892,091 B2 | 2/2011 | Laakso et al. | |
| 7,901,291 B2 | 3/2011 | Hecht et al. | |
| 8,000,484 B2 * | 8/2011 | Rasmussen | A47C 9/022 297/217.4 |
| 8,025,562 B2 | 9/2011 | Walker et al. | |
| 8,025,566 B2 | 9/2011 | Walker et al. | |
| 8,029,353 B2 | 10/2011 | Walker et al. | |
| 8,029,362 B2 | 10/2011 | Walker et al. | |
| 8,077,195 B2 | 12/2011 | Großmann | |
| 8,113,935 B2 | 2/2012 | Walker et al. | |
| 8,184,824 B2 * | 5/2012 | Hettinger | G07F 17/32 381/302 |
| 8,360,841 B2 | 1/2013 | Walker et al. | |
| 8,485,881 B2 | 7/2013 | Griswold et al. | |
| 8,591,308 B2 | 11/2013 | Hoffman et al. | |
| 8,690,662 B2 | 4/2014 | Walker et al. | |
| 8,702,517 B2 | 4/2014 | Walker et al. | |
| 8,758,131 B2 | 6/2014 | Decker et al. | |
| 8,777,744 B2 | 7/2014 | Basallo et al. | |
| 8,784,206 B1 * | 7/2014 | Gronkowski | G07F 17/3206 463/32 |
| 8,814,649 B2 | 8/2014 | Walker et al. | |
| 8,821,266 B2 | 9/2014 | Nicely | |
| 8,992,298 B2 | 3/2015 | Walker et al. | |
| 8,992,299 B2 | 3/2015 | Walker et al. | |
| 9,033,799 B2 | 5/2015 | Decker et al. | |
| 9,039,410 B2 | 5/2015 | Walker et al. | |
| 9,630,106 B2 | 4/2017 | Decker et al. | |
| 10,016,673 B1 | 7/2018 | Milligan et al. | |
| 10,075,804 B1 * | 9/2018 | Kawamura | H04S 7/302 |
| 10,089,063 B2 * | 10/2018 | Thagadur Shivappa | G06F 3/16 |
| 10,334,389 B2 * | 6/2019 | Miyasaka | G10K 15/08 |
| 2002/0077165 A1 | 6/2002 | Bansemer et al. | |
| 2003/0073490 A1 | 4/2003 | Hecht et al. | |
| 2003/0100359 A1 | 5/2003 | Loose et al. | |
| 2008/0070685 A1 * | 3/2008 | Pryzby | G07F 17/3202 463/35 |
| 2008/0113716 A1 | 5/2008 | Beadell et al. | |
| 2008/0113796 A1 * | 5/2008 | Beadell | G07F 17/32 463/35 |
| 2010/0298051 A1 * | 11/2010 | Loose | G07F 17/32 463/35 |
| 2011/0045905 A1 * | 2/2011 | Radek | G07F 17/3227 463/31 |
| 2012/0115608 A1 | 5/2012 | Pfeifer et al. | |
| 2015/0213691 A1 | 7/2015 | Dunn | |
| 2015/0243124 A1 | 8/2015 | Decker et al. | |
| 2015/0382128 A1 * | 12/2015 | Ridihalgh | H04R 29/008 381/57 |
| 2016/0092156 A1 | 3/2016 | Miura | |
| 2016/0180644 A1 | 6/2016 | Idris et al. | |
| 2016/0336022 A1 * | 11/2016 | Florencio | H04R 3/12 |
| 2017/0287287 A1 | 10/2017 | Froy et al. | |
| 2017/0294072 A1 * | 10/2017 | Achmuller | G07F 17/3206 |
| 2018/0040190 A1 | 2/2018 | Keilert et al. | |
| 2018/0078854 A1 | 3/2018 | Achmueller et al. | |
| 2018/0089935 A1 | 3/2018 | Froy, Jr. | |
| 2018/0130283 A1 | 5/2018 | Froy et al. | |
| 2019/0362590 A1 * | 11/2019 | Froy | G07F 17/3211 |

(56) References Cited

U.S. PATENT DOCUMENTS

2020/0045396 A1\* 2/2020 Keilwert ................. G06F 3/012
2020/0045421 A1\* 2/2020 Keilwert ................. H04R 5/02

OTHER PUBLICATIONS

"Focus on acoustic lenses" available at https://discovery.kaust.edu.sa/en/article/235/focus-on-acoustic-lenses, dated Jun. 25, 2016 (4 pages).

\* cited by examiner

ELECTRONIC GAMING MACHINE AND METHOD WITH SELECTABLE SOUND BEAMS

BACKGROUND

Various electronic gaming machines ("EGMs") may be operable to enable play of wagering games. Various EGMs may include one or more primary wagering games. Various EGMs may also include one or more secondary games. Various EGMs may initiate a play of the primary wagering game following receipt of a wager input by the player that indicates how much the player desires to wager. Various EGMs may determine any primary awards for a wagered-on play of the primary wagering game based on the wager amount and a randomly determined outcome of the play of the primary wagering game (such as the randomly determined position that each of the reels of a slot EGM will stop at).

SUMMARY

The present disclosure provides electronic gaming machines and methods of operating electronic gaming machines with selectable sound beams.

In various embodiments, the present disclosure provides an electronic gaming system comprising: an electronic gaming machine including a housing having a front side; a head position tracker supported by the housing; a first speaker array supported by the housing and including a plurality of first speakers, wherein the plurality of first speakers are positioned at different angles to direct sound beams at different angles relative to the front side of the housing; a second speaker array supported by the housing and including a plurality of second speakers, wherein the plurality of second speakers are positioned at different angles to direct sound beams at different angles relative to the front side of the housing. The example electronic gaming machine also includes a processor and a memory device that stores a plurality of instructions that, when executed, cause the processor to, for a play of a game: operate with the head position tracker to capture player head position information; identify a subset of the plurality of first speakers of the first speaker array to activate based on the captured player head position information; identify a subset of the plurality of second speakers of the second speaker array to activate based on the captured player head position information; cause the identified subset of the plurality of first speakers to output a first sound beam associated with audio associated with the play of the game; and cause the identified subset of the plurality of second speakers to output a second sound beam associated with audio associated with the play of the game.

In various embodiments, the present disclosure provides an electronic gaming system comprising: an electronic gaming machine including: a housing having a front side; a head position tracker supported by the housing; a first speaker supported by the housing, wherein the first speaker is movable to different positions relative to the front side of the housing and configured to direct sound beams at different directions relative to the front side of the housing based on the respective position of the first speaker; a second speaker supported by the housing, wherein the second speaker is movable to different positions relative to the front side of the housing and configured to direct sound beams at different directions relative to the front side of the housing based on the respective position of the second speaker. The example electronic gaming machine also includes a processor and a memory device that stores a plurality of instructions that, when executed, cause the processor to, for a play of a game: operate with the head position tracker to capture player head position information; identify a direction of the first speaker to direct sound beams based on the captured player head position information; identify a direction of the second speaker to direct sound beams based on the captured player head position information; cause the first speaker to move to a position relative to the front side of the housing based on the identified direction of the first speaker; cause the second speaker to move to a position relative to the front side of the housing based on the identified direction of the second speaker; cause the first speaker to output a first sound beam associated with audio associated with the play of the game; and cause the second speaker to output a second sound beam associated with audio associated with the play of the game.

In various embodiments, the present disclosure provides a gaming chair comprising a headrest having a front side, the headrest comprising: a first speaker array supported by the headrest and including a plurality of first speakers, wherein the plurality of first speakers are positioned at different angles to direct sound beams at different angles relative to the front side of the headrest; and a second speaker array supported by the headrest and including a plurality of second speakers, wherein the plurality of second speakers are positioned at different angles to direct sound beams at different angles relative to the front side of the headrest. The example gaming chair also includes a processor and a memory device that stores a plurality of instructions that, when executed, cause the processor to, for a play of a game: identify a subset of the plurality of first speakers of the first speaker array to activate based on captured player head position information; identify a subset of the plurality of second speakers of the second speaker array to activate based on the captured player head position information; cause the identified subset of the plurality of first speakers to output a first sound beam associated with audio associated with the play of the game; and cause the identified subset of the plurality of second speakers to output a second sound beam associated with audio associated with the play of the game.

Additional features and advantages are described in, and will be apparent from, the following Detailed Description and the Figures.

DETAILED DESCRIPTION

Figure 1:
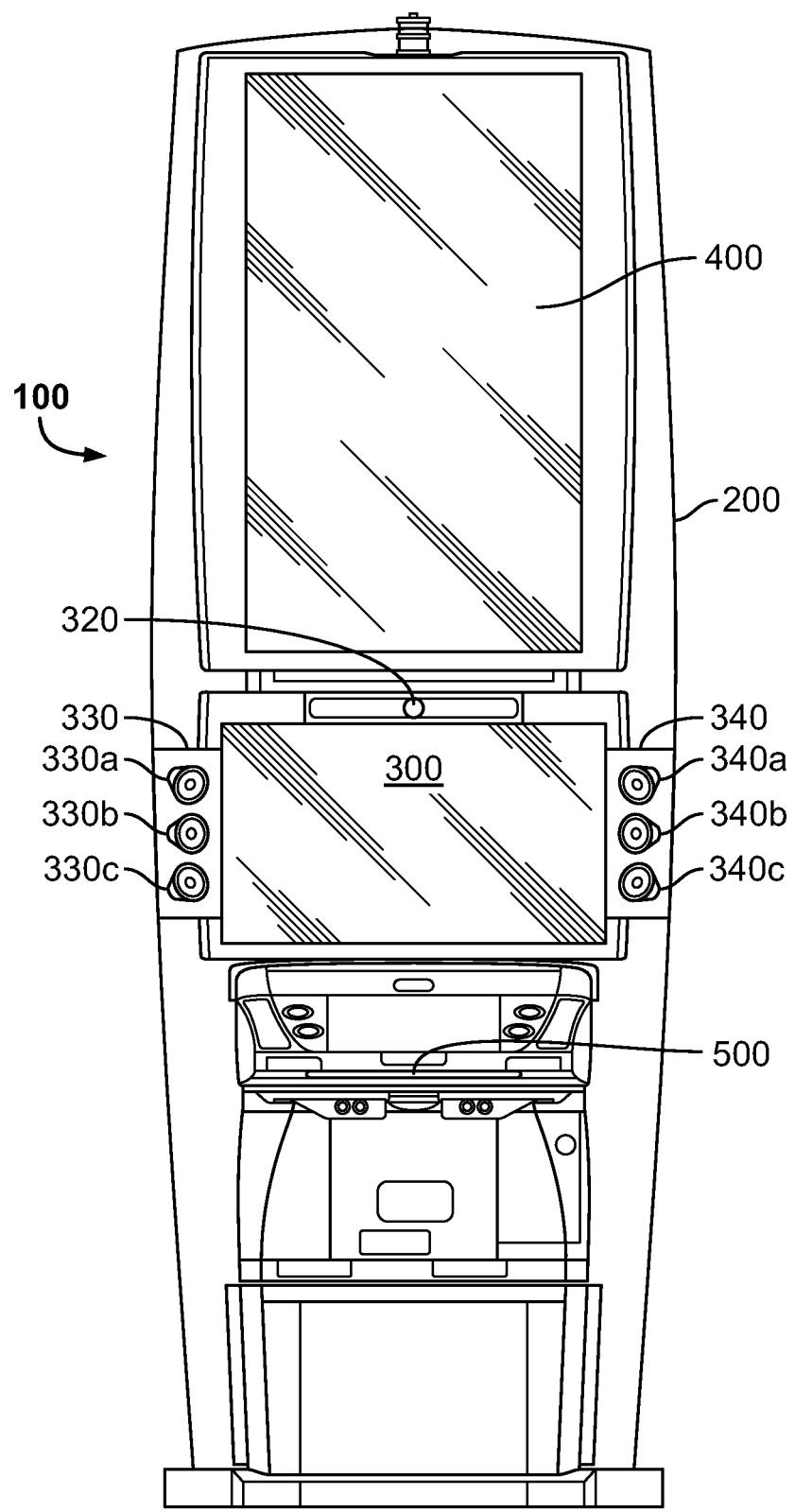
FIG. 1 is a front view of one example embodiment of the electronic gaming machine ("EGM") of the present disclosure including a plurality of input devices, a plurality of output devices, a first speaker array including a first plurality of differently angled speakers, and a second speaker array including a second plurality of differently angled speakers.

Various embodiments of the present disclosure provide new EGMs (and methods of operating such new EGMs). For brevity and clarity, and unless specifically stated otherwise, the term "EGM" is used herein to refer to an electronic gaming machine (such as but not limited to a slot machine, a video poker machine, a video card machine, a video lottery terminal (VLT), a video keno machine, or a video bingo machine).

Various embodiments of the present disclosure provide new gaming chairs (and methods of operating such new gaming chairs) that may be used along with EGMs, including but not limited to the new EGMs of the present disclosure.

Various embodiments of the present disclosure provide new gaming systems (and methods of operating such new gaming systems) that include an EGM and a gaming chair, including the new EGMs and the new gaming chairs disclosed herein.

I. EGM—Selectable Sound Beams Using a Plurality of Speakers Positioned at Different Angles to Direct Sound Beams at Different Angles Referring now to FIGS. 1, 2, 3, and 4, one example EGM of the present disclosure is generally illustrated and indicated by numeral 100. This example EGM 100 illustrated in FIGS. 1, 2, 3, and 4 generally includes a housing 200 (sometimes referred to herein as a "cabinet") having a front side that supports a plurality of output devices and a plurality of input devices of the EGM 100, among other components. In this example embodiment, the EGM 100 includes: (a) a head position tracker 320 supported by the housing 200; (b) a first speaker array 330 supported by the housing 200; (c) a second speaker array 340 supported by the housing 200 and spaced apart from the first speaker array 330; and (d) a processor (not shown) and a memory device (not shown) that co-act or work together with the above-mentioned components to provide the selectable sound beams. In this example embodiment, the first speaker array 330 includes a plurality of independently operable first speakers 330a, 330b, and 330c. The plurality of first speakers 330a, 330b, and 330c are positioned at different angles relative to the housing 200 to direct sound beams at different angles relative to the front side of the housing 200. In this example embodiment, the second speaker array 340 includes a plurality of independently operable second speakers 340a, 340b, and 340c. The plurality of second speakers 340a, 340b, and 340c are positioned at different angles relative to the housing 200 to direct sound beams at different angles relative to the front side of the housing 200.

In this example embodiment, the head position tracker 320, the first speaker array 330, including the plurality of first speakers 330a, 330b, and 330c, the second speaker array 340, including the plurality of second speakers 340a, 340b, and 340c, the processor, and the memory device are configured to produce and output sound beams by operating in real-time or substantially real-time basis to: (a) operate with the head position tracker 320 to capture player head position information; (b) identify a subset of the plurality of first speakers of the first speaker array 330 to activate based on the captured player head position information; (c) identify a subset of the plurality of second speakers of the second speaker array 340 to activate based on the captured player head position information; (d) cause the identified subset of the plurality of first speakers to output a first sound beam associated with audio associated with the play of the game; and (e) cause the identified subset of the plurality of second speakers to output a second sound beam associated with audio associated with the play of the game. It should be appreciated that the processor and the memory device may be configured to operate with one or more sound cards to cause the production and output of sound beams by the selected speakers. In some embodiments, the processor and/or the memory device is integrated with the one or more sound cards. In some embodiments, the one or more sound cards are integrated with the first speaker array 330 and/or the second speaker array 340.

In some embodiments, the EGM 100 includes an audio processing module to cause the production and output of sound beams by the selected speakers. In certain embodiments, the audio processing module executes on an external computer (e.g., by an external audio processing engine), may be executed in a cloud or server-based system, may be executed using a series of digital signal processors (DSPs), and/or may be executed using a series of graphics processing units (GPUs).

It should be appreciated that: (a) the head position tracker 320, (b) the first speaker array 330, including the plurality of first speakers 330a, 330b, and 330c, and (c) the second speaker array 340, including the plurality of second speakers 340a, 340b, and 340c, may each be individually configured or may alternatively be configured to operate with the processor and the memory device to provide each of their designated functions described herein. In other words: (a) the head position tracker 320 may be individually configured to track the movement of the eyes and/or head of the player or may be configured to operate with the processor and the memory device to track the movement of the eyes and/or head of the player; (b) the first speaker array 330, including the plurality of first speakers 330a, 330b, and 330c, may be individually configured to output the first sound beam or may be configured to operate with the processor and the memory device to output the first sound beam; and (c) the second speaker array 340, including the plurality of second speakers 340a, 340b, and 340c, may be individually configured to output the second sound beam or may be configured to operate with the processor and the memory device to output the second sound beam. Thus, for purposes of this disclosure and for brevity, each of these devices are sometimes discussed as performing such tasks individually or operating with the processor and the memory device to perform such tasks, and such descriptions are not intended to limit the present disclosure to either configuration.

In this illustrated example embodiment, the plurality of output devices includes: (a) a first or intermediate display device 300; (b) a second or upper display device 400 positioned above the first or intermediate display device 300; and (c) a third or lower display device 500 positioned below the first or intermediate display device 300. These output devices 300, 400, and 500 are configured to display the game(s), game outcome(s), award(s) (such as the primary and/or secondary game award(s) or other game outcome award(s)), and/or other functionality and information to the player.

In this illustrated example embodiment, the plurality of player input devices enable the player to play one or more wager games provided by the EGM 100. Such player input devices can also include one or more input devices described below in the seventh section of this detailed description. These player input devices are physically touchable or activatable by the player to enable the player to make inputs into the EGM 100.

These output and input devices are configured such that a player may operate the EGM 100 while standing or sitting, but preferably operates the EGM 100 while the player is sitting in front of the EGM 100 such that the player's head is approximately at the same height as the first display device 300.

In this illustrated example embodiment, the head position tracker 320 of the EGM 100 is configured to track the movement of the eyes and/or the head of the player 1 (sometimes referred to herein as "player head position" information). The head position tracker 320 includes one or more eye tracking and/or head tracking cameras supported by the housing 200. In this illustrated example embodiment, the head position tracker 320 includes a camera that is positioned directly above the first display device 300. It should be appreciated that in additional or alternative embodiments, the head position tracker 320 may be positioned at any of different positions that enable the head position tracker 320 to track the movement of the eyes and/or the head of the player 1. In some such embodiments, the head position tracker 320 is supported by the housing 200. In some such embodiments, the head position tracker 320 is not supported by the housing 200.

It should be appreciated that the head position tracker 320 includes a camera including video sensors, image sensors, time-of-flight depth sensors, audio (or acoustic) sensors, capacitive sensors, ultrasound sensors, magnetic field sensors, radar sensors, and/or laser sensors to track the movement of the eyes and/or the head of the player 1.

The head position tracker 320 is configured to track the position of the player's eyes and/or the player's head as the player moves in front of the first display device 300 and thus in front of the housing 200. More specifically, the head position tracker 320 is configured to track the position of the player's eyes and/or the player's head as the player moves in, for example, an eye/head tracking zone in front of the EGM 100. Other embodiments of the present disclosure include two or more eye tracking and/or head tracking cameras employed to work together to track the positions of the player's eyes and/or the player's head as the player moves in front of the first display device 300 and the housing 200. In various embodiments where two or more eye tracking and/or head tracking cameras are employed, such multiple cameras are spaced apart, such as spaced apart 6 inches.

In this illustrated example embodiment, the processor, the memory device, the head position tracker 320, and the first display device 300 of the EGM 100 align a coordinate system relative to the housing 200. The EGM 100 uses the coordinate system to determine in real-time, or substantially real-time, the position (e.g., XYZ coordinates) of the player's head relative to the front side of the housing 200 (e.g., the player head position information). As described below, the EGM 100 uses the determined position of the player's head (e.g., the player head position information) to determine and specifically to select which subsets of the speakers of the first speaker array 330 and the second speaker array 340 to activate to output sound beams.

Examples of the eye tracker and/or head tracker are described in U.S. patent application Ser. No. 15/707,639, entitled "Electronic Gaming Machine and Method Providing Enhanced Physical Player Interaction," filed on Sep. 18, 2017. It should be appreciated that other suitable eye tracking or head tracking systems or devices can be employed in accordance with the present disclosure.

In this illustrated example embodiment, the first speaker array 330 is supported by the housing 200 and positioned directly to the right of the first display device 300 (looking forward). The first speaker array 330 includes the plurality of vertically spaced apart first speakers including an upper first speaker 330a, an intermediate first speaker 330b, and a lower first speaker 330c. In this illustrated example embodiment, the upper first speaker 330a is positioned directly above the intermediate first speaker 330b, and the lower first speaker 330c is positioned directly below the intermediate first speaker 330b. It should be appreciated that the arrangement of the plurality of these speakers can vary in accordance with the present disclosure.

In this illustrated example embodiment, the second speaker array 340 is supported by the housing 200 and positioned directly to the left of the first display device 300 (looking forward). The second speaker array 340 includes the plurality of vertically spaced apart second speakers including an upper second speaker 340a, an intermediate second speaker 340b, and a lower second speaker 340c. In this illustrated example embodiment, the upper second speaker 340a is positioned directly above the intermediate second speaker 340b, and the lower second speaker 340c is positioned directly below the intermediate second speaker 340b. It should be appreciated that the arrangement of the plurality of these speakers can vary in accordance with the present disclosure.

Figure 3:
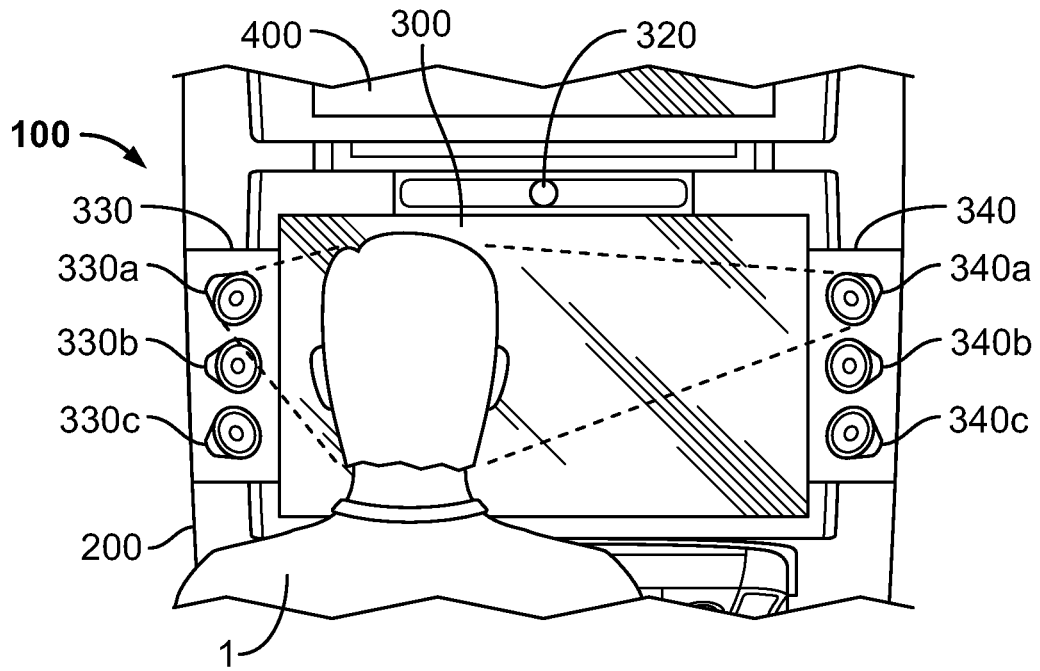
FIG. 3 is an enlarged fragmentary front view of the central portion of the EGM of FIG. 1 and a person sitting in a second position in front of the EGM, and showing, based on second player head position information, a second set of angled speakers including one of speakers of the first speaker array and one of speakers of the second speaker array activated to output respective sound beams.

Each of the first speakers 330a, 330b, and 330c and the second speakers 340a, 340b, and 340c are positioned at different angles to direct sound beams at different angles relative to the front side of the housing 200. For example, and as illustrated in FIG. 3, the upper first speaker 330a is positioned to output sound beams toward the player 1 at a first angle (e.g., at a downward angle and to the left (looking forward)). The upper second speaker 340a is positioned to output sound beams toward the player 1 at a complementary first angle (e.g., at a downward angle and to the right (looking forward)). As used herein, a "complementary angle" refers to an angle that is a complementary to (such as a mirror of) an angle with respect to a line drawn from top to bottom (looking forward) of the EGM 100.

As used herein, the upper first speaker 330a and the upper second speaker 340a may be collectively referred to herein as the "set of upper speakers."

Figure 2:
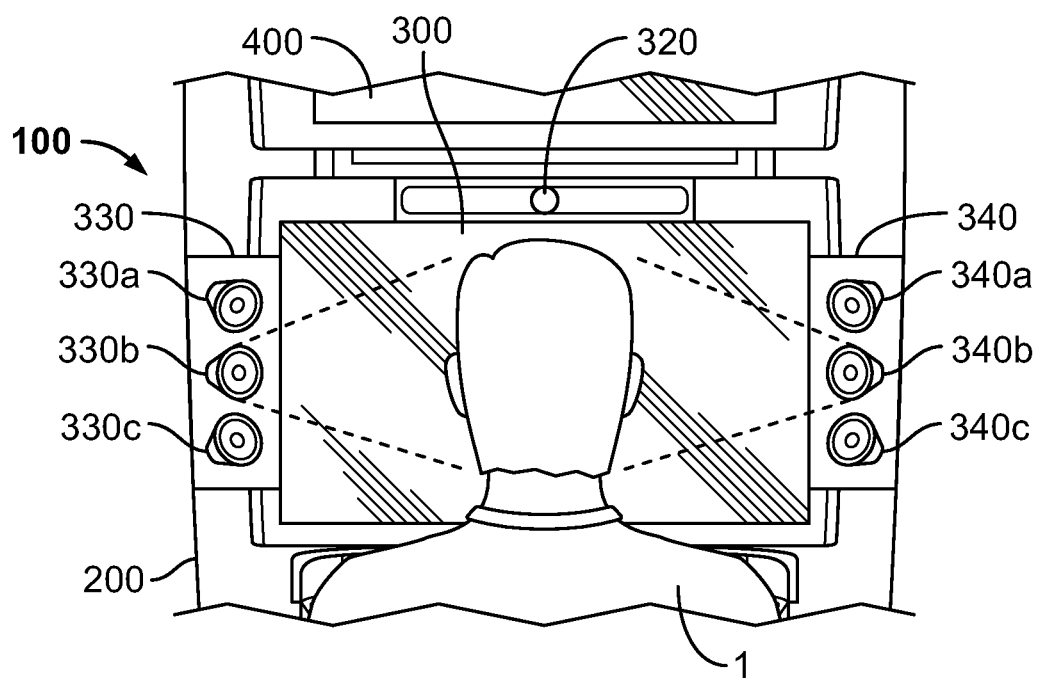
FIG. 2 is an enlarged fragmentary front view of the central portion of the EGM of FIG. 1 and a person sitting in a first position in front of the EGM, and showing, based on first player head position information, a first set of angled speakers including one of the speakers of the first speaker array and one of the speakers of the second speaker array activated to output respective sound beams.

In this illustrated example embodiment, and as illustrated in FIG. 2, the intermediate first speaker 330b is positioned to output sound beams toward the player 1 at a second angle (e.g., to the left (looking forward)). The intermediate second speaker 330b is positioned to output sound beams toward the player 1 at a complementary second angle (e.g., to the right (looking forward)).

As used herein, the intermediate first speaker 330b and the intermediate second speaker 340b may be collectively referred to herein as the "set of intermediate speakers."

Figure 4:
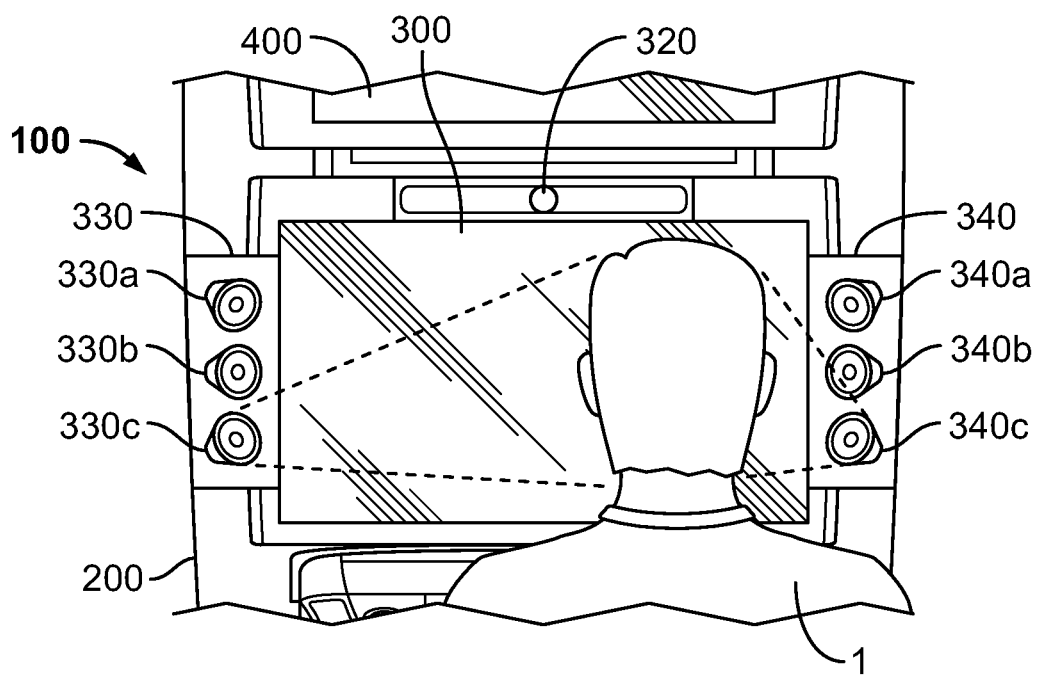
FIG. 4 is an enlarged fragmentary front view of the central portion of the EGM of FIG. 1 and a person sitting in a third position in front of the EGM, and showing, based on third player head position information, a third set of angled speakers including one of speakers of the first speaker array and one of speakers of the second speaker array activated to output respective sound beams.

In this illustrated example embodiment, and as illustrated in FIG. 4, the lower first speaker 330c is positioned to output sound beams toward the player 1 at a third angle (e.g., at an upward angle and to the left (looking forward)). The lower second speaker 340c is positioned to output sound beams toward the player 1 at a complementary third angle (e.g., at an upward angle and to the right (looking forward)).

As used herein, the lower first speaker 330c and the lower second speaker 340b may be collectively referred to herein as the "set of lower speakers."

In certain embodiments, when the EGM 100 determines or selects to activate one speaker of the first speaker array (i.e., the set of upper speakers, the set of intermediate speakers, and/or the set of lower speakers), the EGM 100 also activates the corresponding speaker of the second speaker array. For example, the EGM 100 activates the upper first speaker 330a and also activates the upper second speaker 340a.

In this illustrated example, when speaker(s) of the first speaker array 330 and/or the second speaker array 340 are selected to be activated, they output sound beams in their respective angled directions. In this illustrated example, the EGM 100 selects one or more of the speakers of the first speaker array 330 and/or the second speaker array 340 based on the player head position information obtained from the player head tracker 320. For example, the EGM 100 may determine, based on the player head position information that that the player head is in a first position relative to the front side of the housing. Based on the determined player head position information, the EGM 100 then selects one or more of the first speakers of the first speaker array 330 and/or one or more of the speakers of the second speaker array 340 to activate to output sound beams to provide the player 1 with an envelope of sound beams associated with play of the game at the EGM 100.

In this illustrated example embodiment, the EGM 100 causes the activated subset of the first speakers 330a, 330b, and 330c of the first speaker array 330 and the identified subset of the second speakers 340a, 340b, and 340c of the second speaker array 340 to simultaneously output respective sound beams. For example, and referring to FIG. 2, based on the player head position information provided by the player head tracker 320, the EGM 100 selects the intermediate first speaker 330b of the first speaker array 330 and the intermediate second speaker 330b of the second speaker array 340 to activate. The activated subset of speakers (i.e., the intermediate first speaker 330b and the intermediate second speaker 340b) then simultaneously output sound beams toward the player 1.

In this example embodiment, the EGM 100 utilizes signal propagation delays and/or level differences to account for the relative positions of the activated speakers of the first speaker array 330, the second speaker array 340, and the player head position information. However, it should be appreciated that additional techniques for providing the player 1 with a uniform interaural experience (i.e., controlling for difference between the reception of the sound beams by each ear of the player 1 based on, for example, timing and intensity) may additionally or alternatively be used.

In this illustrated example embodiment, the EGM 100 selects the plurality of speaker(s) to activate so that the player head is best covered by sound beams outputted by the first speaker array 330 and the second speaker array 340. For example, the EGM 100 selects, based on the player head position information, to activate a subset of the speakers of the respective speaker arrays 330 and 340. For example, based on first player head position information, the EGM 100 may select zero, one, two, or more of the speakers of the first speaker array 330 to activate and may select zero, one, two or more of the speakers of the second speaker array 340 to activate.

The EGM 100 may then select a different subset of the speaker(s) of the respective speaker arrays 330 and 340 to activate based on different player head position information. For example, the EGM 100 may select zero, one, two or more of the speakers of the first speaker array 330 to activate and may select zero, one, two, or more of the speakers of the second speaker array 340 to activate based on second player head information.

In this illustrated example embodiment, the subset of the speakers associated with the first player head position information and the subset of the speakers associated with the second player head position information include at least one speaker that is different (e.g., not included in the subset of the speakers associated with the first player head position information or the subset of the speakers associated with the second player head position information).

In certain embodiments, the subset of the speakers associated with the first player head position information and the subset of the speakers associated with the second player head position include a shared speaker. For example, the EGM 100 activates the upper first speaker 330a based on first player head position information, and the EGM 100 activates the upper first speaker 330a and the intermediate first speaker 330b based on second player head position information. In this illustrated example, the upper first speaker 330a is a shared speaker (e.g., included in both subsets of speakers).

In this illustrated example embodiment, the EGM 100 activates each of the speakers of a speaker array by associating the different speakers with respective output volumes. For example, the EGM 100 may activate the first speakers 330a, 330b, and 330c of the first speaker array 330 by associating the upper first speaker 330a with a first output volume (e.g., high), associating the intermediate first speaker 330b with a second output volume (e.g., medium), and associating the lower first speaker 330c with a third output volume (e.g., low). However, it should be appreciated that in alternative or additional embodiments, the EGM 100 may associate one or more of the speakers with the same output volume (e.g., may associate the upper first speaker 330a and the intermediate first speaker 330b with the medium output volume) and/or associate one or more of the speakers with alternate output volumes (e.g., off).

In certain embodiments, the EGM 100 includes an array of fixed angled speakers that is centrally positioned, relative to the front side of the housing 200. For example, the centrally-positioned array of fixed angled speakers may include a first subset of fixed angled speakers that correspond to the first speakers 330a, 330b, and 330c, and include a second subset of fixed angled speakers that correspond to the second speakers 340a, 340b, and 340c. Each of the fixed angled speakers of the centrally-positioned array are positioned at different angles to direct sound beams at different angles relative to the front side of the housing 200. For example, each speaker of the first subset of fixed angled speakers may be positioned to output sound beams toward the player 1 at first angles and each speaker of the second subset of fixed angled speakers may be positioned to output sound beams toward the player 1 at complementary first angles In certain embodiments, the EGM 100 utilizes a phase-shifted audio playback system to control the direction (and position) of the output sound beams. In certain embodiments, the EGM 1100 may modulate the time and/or output levels (e.g., volume) of the output sound beams to control the direction (and/or position) of the output sound beams.

II. Example Method

Figure 5:
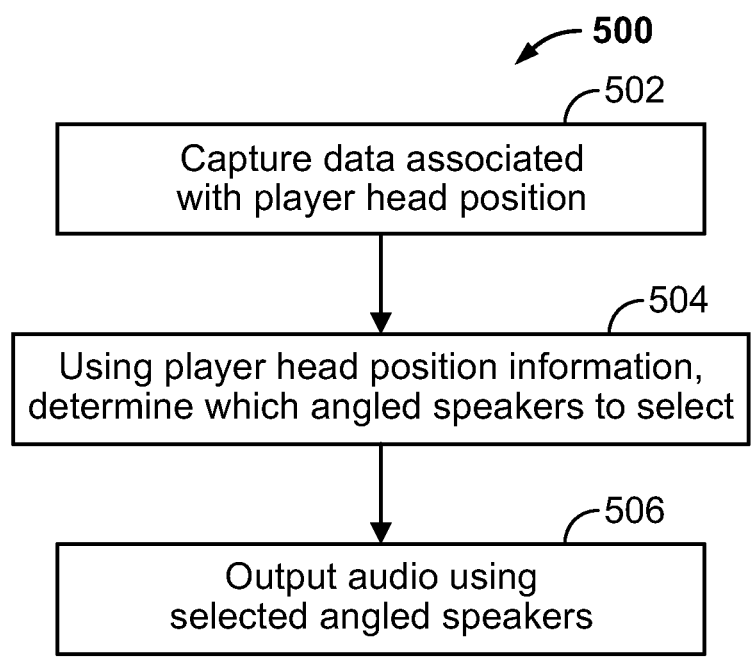
FIG. 5 is a flowchart of an example process or method of operating the EGM of FIG. 1 to provide one example embodiment of providing selectable sound beams of the present disclosure.

FIG. 5 is a flowchart of an example process or method 500 of one example embodiment of the present disclosure that provides selectable sound beams with differently angled speakers. In various embodiments, the process 500 is represented by a set of instructions stored in one or more memories and executed by one or more processors. Although the process 500 is described with reference to the flowchart in FIG. 5, it should be appreciated that many other processes of performing the acts associated with this illustrated process of FIG. 5 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this example embodiment, the process 500 of FIG. 5 begins as indicated by block 502 when the gaming system captures data associated with player head position of the player 1. For example, the player head tracker 320 captures player head position information that includes XYZ coordinate positions of the head of the player 1 while the player 1 is positioned relative to the EGM 100.

As indicated by block 504, the EGM 100 uses the player head position information to determine which speakers to select from the angled speakers of the speaker arrays 330 and 340. For example, the EGM 100 determines, based on the player head position information, a subset of the first speakers 330a, 330b, and 330c of the first speaker array 330 to activate, a subset of the second speakers 340a, 340b, and 340c of the second speaker array 340 to activate, respective output volumes to associate with each of the speakers of the speaker arrays 330 and 340, and signal propagation delays to associate with the audio to be output by the activated speakers, etc. For example, the EGM 100 causes, based on first player head position information, to activate the upper first speaker 330a and the upper second speaker 340a at a "high" output volume, and to cause the other speakers of the speaker arrays 330 and 340 to output audio at a "low" output volume.

As indicated by block 506, the EGM 100 then causes the selected speakers of the speaker arrays 330 and 340 to output sound beams based on the determinations. For example, the upper first speaker 330a and the upper second speaker 340a simultaneously output sound beams at a "high" output volume, while the remaining speakers of the speaker arrays 330 and 340 (i.e., the first speakers 330b and 330c and the second speakers 340b and 340c) simultaneously output sound beams at a "low" output volume.

It should be appreciated that the process 500 may return to block 502 to capture data associated with player head position so that the sound beams output by the speaker arrays 330 and 340 can be updated to adjust for any change in positioning of the head of the player 1 (e.g., movement of the player head).

III. EGM—Selectable Sound Beams Using a Plurality of Movable Speakers Movable to Different Positions to Direct Sound Beams at Different Directions Based on the Positions of the Respective Movable Speakers Referring now to FIGS. 6, 7, and 8, another example EGM of the present disclosure is generally illustrated and indicated by numeral 1100. This example EGM 1100 illustrated in FIGS. 6, 7, and 8 generally includes a housing 1200 having a front side that supports a plurality of output devices and a plurality of input devices of the EGM 1100, among other components. In this example embodiment, the EGM 1100 includes: (a) a head position tracker 1320 supported by the housing 1200; (b) a first speaker 1330 supported by the housing 1200; (c) a second speaker 1340 supported by the housing 1200; and (d) a processor (not shown) and a memory device (not shown) that co-act or work together with the above-mentioned components to provide the selectable sound beams. In this example embodiment, the first speaker 1330 is movable to different positions relative to the front side of the housing 1200. The first speaker 1330 is configured to direct sound beams at different directions relative to the front side of the housing 1200 based on a respective position of the first speaker 1330. In this example embodiment, the second speaker 1340 is movable to different positions relative to the front side of the housing 1200. The second speaker 1340 is configured to direct sound beams at different directions relative to the front side of the housing 1200 based on a respective position of the second speaker 1340. It should be appreciated that the processor and the memory device may be configured to operate with one or more sound cards to cause the production and output of sound beams by the selected speakers. In some embodiments, the processor and/or the memory device is integrated with the one or more sound cards. In some embodiments, the one or more sound cards are integrated with the first speaker 1330 and/or the second speaker 1340.

In some embodiments, the EGM 1100 includes an audio processing module to cause the production and output of sound beams by the selected speakers. In certain embodiments, the audio processing module executes on an external computer (e.g., by an external audio processing engine), may be executed in a cloud or server-based system, may be executed using a series of digital signal processors (DSPs), and/or may be executed using a series of graphics processing units (GPUs).

In this example embodiment, the head position tracker 1320, the first speaker 1330, the second speaker 1340, the processor, and the memory device are configured to produce and output sound beams by operating in real-time or substantially real-time basis to, for a play of a game: (a) operate with the head position tracker 1320 to capture player head position information; (b) identify a direction of the first speaker 1330 to direct sound beams based on the captured player head position information; (c) identify a direction of the second speaker 1340 to direct sound beams based on the captured player head position information; (d) cause the first speaker 1330 to move to a position relative to the front side of the housing 1200 based on the identified direction of the first speaker 1330; (e) cause the second speaker 1340 to move to a position relative to the front side of the housing 1200 based on the identified direction of the second speaker 1340; (f) cause the first speaker 1330 to output a first sound beam associated with audio associated with the play of the game; and (g) cause the second speaker 1340 to output a second sound beam associated with audio associated with the play of the game.

It should be appreciated that: (a) the head position tracker 1320; (b) the first speaker 1330; and (c) the second speaker 1340 may each be individually configured or may alternatively be configured to operate with the processor and the memory device to provide each of their designated functions described herein. In other words: (a) the head position tracker 1320 may be individually configured to track the movement of the eyes and/or head of the player or may be configured to operate with the processor and the memory device to track the movement of the eyes and/or head of the player; (b) the first speaker 1330 may be individually configured to output the first sound beam or may be configured to operate with the processor and the memory device to output the first sound beam; and/or (c) the second speaker 1340 may be individually configured to output the second sound beam or may be configured to operate with the processor and the memory device to output the second sound beam. Thus, for purposes of this disclosure and for brevity, each of these devices are sometimes discussed as performing such tasks individually or operating with the processor and the memory device to perform such tasks, and such descriptions are not intended to limit the present disclosure to either configuration.

In this illustrated example embodiment, and similar to the EGM 100 of FIGS. 1 to 4, the plurality of output devices of the EGM 1100 includes: (a) a first or intermediate display device 1300, (b) a second or upper display device 1400 positioned above the first or intermediate display device 1300, and (c) a third or lower display device 1500 positioned below the first or intermediate display device 1300.

In this illustrated example embodiment, and similar to the EGM 100 of FIGS. 1 to 4, the plurality of player input devices enable the player to play one or more wager games provided by the EGM 1100.

In this illustrated example embodiment, the head position tracker 1320 of the EGM 1100 is configured to track the movement of the eyes and/or the head of the player 1. The head position tracker 1320 of the EGM 1100 operates similar to the head position tracker 320 of the EGM 100 and, thus, is not described in more detail in this section.

In this illustrated example embodiment, the first speaker 1330 is supported by the housing 1200 and positioned directly to the right of the first display device 1300 (looking forward). The first speaker 1330 includes a motorized speaker that is movable to different positions relative to the front side of the housing 1200. In this illustrated example embodiment, the first speaker 1330 is configured to direct sound beams at different directions relative to the front side of the housing 1200 based on the respective position of the first speaker 1330. For example, the EGM 1100 may cause the first speaker 1330 to move to a different position to output sound beams in a direction based on player head position information obtained from the player head tracker 1320.

In this illustrated example embodiment, the second speaker 1340 is supported by the housing 1200 and positioned directly to the left of the first display device 1300 (looking forward). The second speaker 1340 includes a motorized speaker that is movable to different positions relative to the front side of the housing 1200. In this illustrated example embodiment, the second speaker 1340 is configured to direct sound beams at different directions relative to the front side of the housing 1200 based on the respective position of the second speaker 1340. For example, the EGM 1100 may cause the second speaker 1340 to move to a different position to output sound beams in a direction based on player head position information obtained from the player head tracker 1320.

While in the illustrated example embodiment the first speaker 1330 and the second speaker 1340 are motorized speakers that are movable to different positions relative to the front side of the housing 1200, it should be appreciated that other techniques for moving the first speaker 1330 and/or the second speaker 1340 may additionally or alternatively be used. For example, the first speaker 1330 and/or the second speaker 1340 may be an array of fixed angled speakers (such as the speaker arrays 330 and 340 of FIGS. 1 to 4) that is in communication with a modulator that modulates the array of fixed angles speakers to direct sound beams at different directions relative to the front side of the housing 1200.

In this illustrated example embodiment, the EGM 1100 selects the position of the first speaker 1330 and the position of the second speaker 1340 so that the player head is best covered by sound beams output by the first speaker 1330 and the second speaker 1340.

Figure 7:
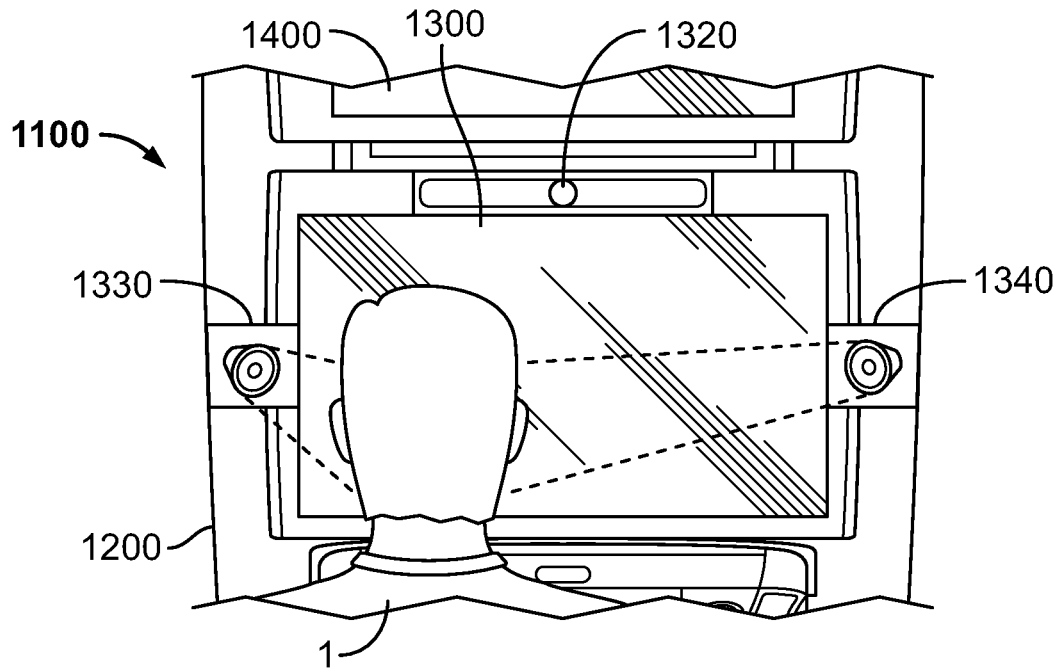
FIG. 7 is an enlarged fragmentary front view of the central portion of the EGM of FIG. 6 and a person sitting in a first position in front of the EGM, and showing, based on first player head position information, the first movable speaker in a first position and the second movable speaker in a first position, wherein the respective first and second speakers in the respective first positions are activated to output sound beams based on the first player head position information.

In this illustrated example embodiment, and as illustrated in FIG. 7, the first speaker 1330 is positioned to output sound beams at a first direction towards the player 1 (e.g., at a downward angle and to the left (looking forward)). The second speaker 1340 is positioned to output sound beams at a complementary first angle towards the player 1 (e.g., at a downward angle and to the right (looking forward)). In this illustrated example, the EGM 1100 causes the first speaker 1330 and the second speaker 1340 to move to their respective positions to output their respective sound beams at their first respective directions based on first player head position information.

Figure 8:
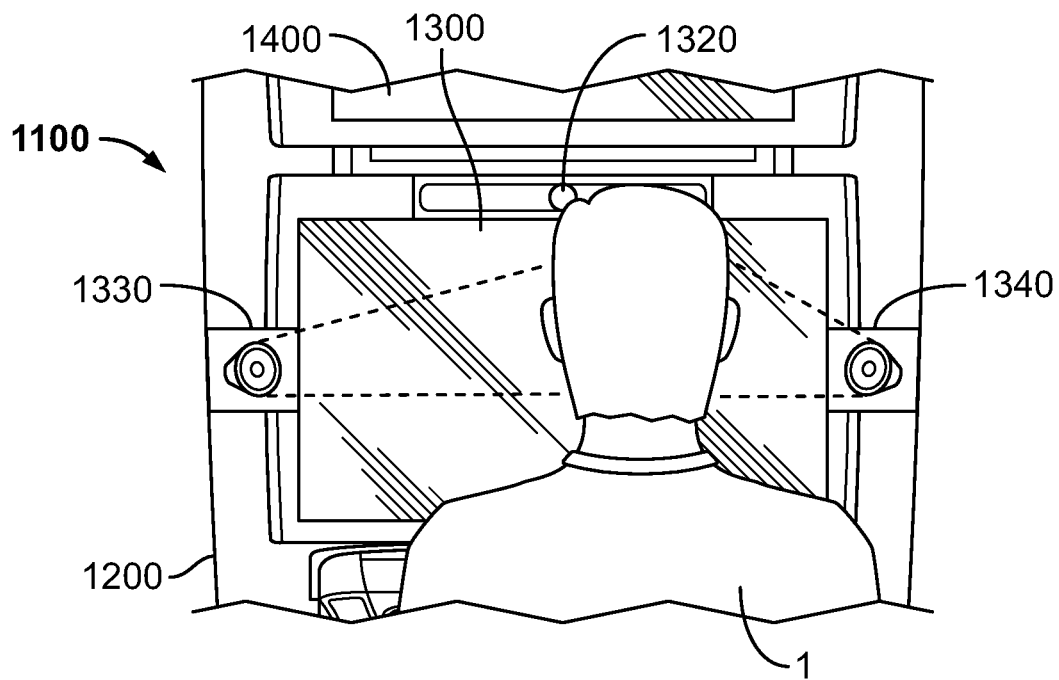
FIG. 8 is an enlarged fragmentary front view of the central portion of the EGM of FIG. 6 and a person sitting in a second position in front of the EGM, and showing, based on second player head position information, the first movable speaker in a second position and the second movable speaker in a second position, wherein the respective first and second speakers in the respective second positions are activated to output sound beams based on the second player head position information.

In this illustrated example embodiment, and as illustrated in FIG. 8, the first speaker 1330 is positioned to output sound beams at a second direction towards the player 1 (e.g., at an upward angle and to the left (looking forward)). The second speaker 1340 is positioned to output sound beams at a complementary second angle towards the player 1 (e.g., at an upward angle and to the right (looking forward)). In this illustrated example, the EGM 1100 causes the first speaker 1330 and the second speaker 1340 to move to their respective positions to output their respective sound beams at their second respective directions based on second player head position information.

In this illustrated example embodiment, the first speaker 1330 and the second speaker 1340 are configured to simultaneously output respective sound beams toward the player 1.

In this illustrated example embodiment, the EGM 1100 utilizes signal propagation delays and/or level differences to account for the relative positions of the first speaker 1330, the second speaker 1340, and the player head position information. However, it should be appreciated that additional techniques for providing the player 1 with a uniform interaural experience may additionally or alternatively be used.

In operation, in this example embodiment, the head position tracker 1320 captures player head position information (e.g., XYZ coordinates) of the player 1 relative to the front side of the housing 1200. The EGM 1100 then identifies a direction of the first speaker 1330 and a direction of the second speaker 1340 to direct sound beams based on the captured player head position information. For example, the player head position information may indicate that the player is sitting relatively low in their seat relative to, for example, the first display device 1300 and determine to direct sound beams in a relatively downward direction. The EGM 1100 then causes the first speaker 1330 and the second speaker 1340 to move to respective positions that facilitate outputting sound beams in the identified directions. When the speakers 1330 and 1340 are set in their respective positions, the EGM 1100 causes the respective speakers 1330 and 1340 to output respective sound beams associated with audio.

Although not shown, it should be appreciated that in certain embodiments, the angled speakers of the speaker arrays 330 and 340 of the EGM 100 and the movable speakers 1330 and 1340 of the EGM 1100 may be combined. For example, in certain embodiments, an EGM includes a first speaker array including a plurality of first angled speakers that are positioned at different angles to direct sound beams at different angles relative to the front side of the housing of the EGM, such as the speakers 330a, 330b, and 330c. The first speaker array also includes a first movable speaker that is movable to different positions relative to the front side of the housing of the EGM and that is configured to direct sound beams at different directions relative to the front side of the housing based on the respective position of the first movable speaker, such as the movable speaker 1330. The EGM also includes a second speaker array including a plurality of second angled speakers that are positioned at different angles to direct sound beams at different angles relative to the front side of the housing of the EGM, such as the speakers 340a, 340b, and 340c. The second speaker array also includes a second movable speaker that is movable to different positions relative to the front side of the housing of the EGM and that is configured to direct sound beams at different directions relative to the front side of the housing based on the respective position of the second movable speaker, such as the movable speaker 1340.

In certain such embodiments, the first movable speaker is positioned within the first speaker array and positioned adjacent to the first angled speakers (e.g., positioned directly above the first angled speakers, positioned directly below the first angled speakers, and/or positioned directly next to one of the first angled speakers). For example, the first speaker array includes one or more angled speakers and one or more movable speakers.

In certain such embodiments, the first movable speaker may be positioned between the first angled speakers within the first speaker array. For example, the first speaker array may include an upper angled speaker, a first movable speaker positioned directly below the upper angled speaker (looking forward), an intermediate angled speaker positioned directly below the first movable speaker (looking forward), and a lower angled speaker positioned directly below the intermediate angled speaker (looking forward). However, it should be appreciated that additional or alternate combinations of the angled speakers and the movable speaker within the first speaker array are also possible.

Similarly, in certain such embodiments, the second movable speaker is positioned within the second speaker array and positioned adjacent to the second angled speakers (e.g., positioned directly above the second angled speakers, positioned directly below the second angled speakers, and/or positioned directly next to one of the second angled speakers). For example, the second speaker array includes one or more angled speakers and one or more movable speakers.

In certain such embodiments, the second movable speaker may be positioned between the second angled speakers within the second speaker array. For example, the second speaker array may include an upper angled speaker, a second movable speaker positioned directly below the upper angled speaker (looking forward), an intermediate angled speaker positioned directly below the second movable speaker (looking forward), and a lower angled speaker positioned directly below the intermediate angled speaker (looking forward). However, it should be appreciated that additional or alternate combinations of the angled speakers and the movable speaker within the second speaker array are also possible.

In certain embodiments, the movable speakers 1330 and 1340 of the EGM 1100 may be positioned adjacent to the speaker arrays 330 and 340 of the EGM 100. For example, in certain embodiments, an EGM includes a first speaker array including a plurality of first angled speakers that are positioned at different angles to direct sound beams at different angles relative to the front side of the housing of the EGM, such as the speakers 330a, 330b, and 330c. The EGM also includes a first movable speaker that is movable to different positions relative to the front side of the housing of the EGM and that is configured to direct sound beams at different directions relative to the front side of the housing based on the respective position of the first movable speaker, such as the movable speaker 1330. In certain such embodiments, the EGM also includes a second speaker array including a plurality of second angled speakers that are positioned at different angles to direct sound beams at different angles relative to the front side of the housing of the EGM, such as the speakers 340a, 340b, and 340c. The EGM also includes a second movable speaker that is movable to different positions relative to the front side of the housing of the EGM and that is configured to direct sound beams at different directions relative to the front side of the housing based on the respective position of the second movable speaker, such as the movable speaker 1340.

In certain such embodiments, the first movable speaker is positioned adjacent to the first speaker array (e.g., positioned directly above the first speaker array, positioned directly below the first speaker array, and/or positioned directly next to the first speaker array) and the second movable speaker is positioned adjacent to the second speaker array (e.g., positioned directly above the second speaker array, positioned directly below the second speaker array, and/or positioned directly next to the second speaker array).

It should be appreciated that in certain embodiments, the quantity of angled speakers and/or movable speakers included in an EGM may vary. For example, a speaker array may include zero, one, two, or more angled speakers and also include zero, one, two, or more movable speakers.

It should be appreciated that in certain embodiments, the quantity of movable speakers positioned adjacent to a speaker array may vary. For example, one, two, or more movable speakers may be positioned in a movable speaker array that is positioned adjacent to a speaker array including a plurality of angled speakers.

In certain embodiments, the EGM 1100 utilizes a phase-shifted audio playback system to control the direction (and position) of the output sound beams. In certain embodiments, the EGM 1100 may modulate the time and/or output levels (e.g., volume) of the output sound beams to control the direction (and/or position) of the output sound beams.

IV. Gaming Chair—Selectable Sound Beams Using a Plurality of Speakers Positioned at Different Angles in a Headrest of a Gaming Chair to Direct Sound Beams at Different Angles Referring now to FIG. 9, one example gaming chair of the present disclosure is generally illustrated and indicated by numeral 2000. The example gaming chair 2000 may be used in conjunction with an EGM, such as the example EGM 100 of FIGS. 1 to 4 or the EGM 1100 of FIGS. 6 to 8. This example gaming chair 2000 illustrated in FIG. 9 generally includes a frame (not shown), a cushion 2302, and a post 2350 that couples the gaming chair 2000 to a surface, among other components. In this example embodiment, the gaming chair 3000 includes: (a) a headrest 2328 having a front side (not labeled); (b) a first headrest speaker array 2330 supported by the headrest 2328; (c) a second headrest speaker array 2340 supported by the headrest 2328; and (d) a processor (not shown) and a memory device (not shown) that co-act or work together with the above-mentioned components to provide selectable sound beams. It should be appreciated that the processor and the memory device may be configured to operate with one or more sound cards to cause the production and output of sound beams by the selected speakers. In some embodiments, the processor and/or the memory device is integrated with the one or more sound cards. In some embodiments, the one or more sound cards are integrated with the first headrest speaker array 2330 and/or the second headrest speaker array 2340.

It should be appreciated that in certain embodiments, the processor and/or the memory device are external of the headrest 2328 and/or the gaming chair 2000. In some such embodiments, the external processor and/or the external memory device facilitate control of the first headrest speaker array 2330 and/or the second headrest speaker array 2340.

In some embodiments, the EGM and/or the gaming chair 2000 includes an audio processing module to cause the production and output of sound beams by the selected speakers. In certain embodiments, the audio processing module executes on an external computer (e.g., by an external audio processing engine), may be executed in a cloud or server-based system, may be executed using a series of digital signal processors (DSPs), and/or may be executed using a series of graphics processing units (GPUs).

In this example embodiment, the first headrest speaker array 2330 includes a plurality of independently operable first headrest speakers 2330a, 2330b, and 2330c. The plurality of first headrest speakers 2330a, 2330b, and 2330c are positioned at different angles to direct sound beams at different angles relative to the front side of the headrest 2328 and the front side of the EGM. In this example embodiment, the second headrest speaker array 2340 includes a plurality of independently operable second headrest speakers 2340a, 2340b, and 2340c. The plurality of second headrest speakers 2340a, 2340b, and 2340c are positioned at different angles to direct sound beams at different angles relative to the front side of the headrest 2328.

In this illustrated example embodiment, the first headrest speaker array 2330, including the plurality of first headrest speakers 2330a, 2330b, and 2330c, the second headrest speaker array 2340, including the plurality second headrest speakers 2340a, 2340b, and 2340c, the processor, and the memory device are configured to produce and output sound beams by operating in real-time or substantially real-time basis to: (a) identify a subset of the plurality of first headrest speakers 2330a, 2330b, and 2330c of the first headrest speaker array 2330 to select to activate based on captured player head position information; (b) identify a subset of the plurality of second headrest speakers 2340a, 2340b, and 2340c of the second headrest speaker array 2340 to select to activate based on the captured player head position information; (c) cause the identified subset of the plurality of first headrest speakers 2330a, 2330b, and 2330c to output a first sound beam associated with audio associated with a play of a game; and (d) cause the identified subset of the plurality of second headrest speakers 2340a, 2340b, and 2340c to output a second sound beam associated with the audio associated with the play of the game.

In this example embodiment, the cushion 2302 of the gaming chair 2000 includes a back portion 2304 and a seat portion 2306. The back portion 2304 includes a front surface 2308, an opposing rear surface 2310, a first side surface 2312, and an opposing second side surface 2314. The back portion 2304 also includes a top surface 2316 and an opposing bottom surface 2318.

In this example embodiment, the seat portion 2306 of the gaming chair 2000 includes a top surface 2320, an opposing bottom surface 2322, a front surface 2324, and an opposing rear surface 2326.

In this example embodiment, the gaming chair 2000 utilizes a head position tracker of the EGM (e.g., the example head position tracker 320 of the EGM 100 and/or the head position tracker 1320 of the EGM 1100) to track the movement of the eyes and/or the head of the player 1. However, it should be appreciated that in certain embodiments, the gaming chair 2000 may include a separate or additional head position tracker. For example, the headrest 2328 may include a camera to track the movement of the head of the player 1. The head position tracker provides player head position information that includes a position (e.g., XYZ coordinates) of the player relative to the front side of the housing of the EGM and/or the front side of the gaming chair 2000.

In this illustrated example embodiment, the first headrest speaker array 2330 is supported by the headrest 2328 and positioned on the right-side of the headrest 2328 (looking forward). The first headrest speaker array 2330 includes the plurality of first headrest speakers including an upper first headrest speaker 2330a, an intermediate first headrest speaker 2330b, and a lower first headrest speaker 2330c. In this illustrated example embodiment, the upper first headrest speaker 2330a is positioned directly above the intermediate first headrest speaker 2330b, and the lower first headrest speaker 2330c is positioned directly below the intermediate first headrest speaker 2330b.

In this illustrated example embodiment, the second headrest speaker array 2340 is supported by the headrest 2338 and positioned on the left-side of the headrest 2328 (looking forward). The second headrest speaker array 2340 includes the plurality of second speakers including an upper second headrest speaker 2340a, an intermediate second headrest speaker 2340b, and a lower second headrest speaker 2340c. In this illustrated example embodiment, the upper second headrest speaker 2340a is positioned directly above the intermediate second headrest speaker 2340b, and the lower second headrest speaker 2340c is positioned directly below the intermediate second headrest speaker 2340b.

Each of the first headrest speakers 2330a, 2330b, and 2330c and the second headrest speakers 2340a, 2340b, and 2340c are positioned at different angles to direct sound beams at different angles relative to the front side of the headrest 2328. For example, the upper first headrest speaker 2330a is positioned to output sound beams toward the player 1 at a first angle, and the upper second headrest speaker 2340a is positioned to output sound beams toward the player 1 at a complementary first angle.

As used herein, the upper first headrest speaker 2330a and the upper second headrest speaker 2340a may be collectively referred to herein as the "set of upper speakers."

In this illustrated example embodiment, the intermediate first headrest speaker 2330b is positioned to output sound beams toward the player 1 at a second angle (different than the first angle), and the intermediate second headrest speaker 2330b is positioned to output sound beams toward the player 1 at a complementary second angle (different than the complementary first angle).

As used herein, the intermediate first headrest speaker 2330b and the intermediate second headrest speaker 2340b may be collectively referred to herein as the "set of intermediate speakers."

In this illustrated example embodiment, the lower first headrest speaker 2330c is positioned to output sound beams toward the player 1 at a third angle (different than the first angle and the second angle), and the lower second headrest speaker 2340c is positioned to output sound beams toward the player 1 at a complementary third angle (different than the complementary first angle and the complementary second angle).

As used herein, the lower first headrest speaker 2330c and the lower second headrest speaker 2340b may be collectively referred to herein as the "set of lower speakers."

In certain embodiments, when the EGM determines to activate one speaker of the set speakers (i.e., the set of upper headrest speakers, the set of intermediate headrest speakers, and/or the set of lower headrest speakers), the EGM also activates the other speaker of the set of speakers. For example, the EGM activates the upper first headrest speaker 2330a and also activates the upper second headrest speaker 2340a.

In certain embodiments, one or more of the first angle associated with the upper first headrest speaker 2330a, the second angle associated with the intermediate first headrest speaker 2330b, and the third angle associated with the lower first headrest speaker 2330c (and the complementary first angle associated with the upper second headrest speaker 2340a, the complementary second angle associated with the intermediate second headrest speaker 2340b, and the complementary third angle associated with the lower second headrest speaker 2340c) are different angles. For example, none of the first angle, the second angle or third angle are the same angle.

In certain embodiments, the first angle associated with the upper first headrest speaker 2330a, the second angle associated with the intermediate first headrest speaker 2330b, and the third angle associated with the lower first headrest speaker 2330c (and the complementary first angle associated with the upper second headrest speaker 2340a, the complementary second angle associated with the intermediate second headrest speaker 2340b, and the complementary third angle associated with the lower second headrest speaker 2340c) are the same angle. However, because of the relative positioning of the respective headrest speakers, the sound beams are directed to different positions of the gaming chair 2000.

In this illustrated example, when speaker(s) of the first headrest speaker array 2330 and/or the second headrest speaker array 2340 are activated, they output sound beams in their respective directions. In this illustrated example, the EGM and/or the gaming chair 2000 selects one or more of the speakers of the first headrest speaker array 2330 and/or the second headrest speaker array 2340 based on the player head position information obtained from the player head tracker. For example, the EGM and/or the gaming chair 2000 may determine, based on the player head position information that that the player head is in a first position relative to the front side of the headrest. Based on the determined player head position information, the EGM and/or the gaming chair 2000 then selects one or more of the first speakers of the first headrest speaker array 2330 and/or one or more of the speakers of the second headrest speaker array 2340 to activate to output sound beams to provide the player seated in the gaming chair 2000 with an envelope of sound beams associated with play of the game at the EGM.

In this illustrated example embodiment, the EGM and/or the gaming chair 2000 causes the activated subset of the first headrest speakers 2330a, 2330b, and 2330c of the first headrest speaker array 2330 and the identified subset of the second headrest speakers 2340a, 2340b, and 2340c of the second headrest speaker array 2340 to simultaneously output respective sound beams. For example, based on the player head position information provided by the player head tracker, the EGM and/or the gaming chair 2000 selects the intermediate first headrest speaker 2330b of the first headrest speaker array 2330 and the intermediate second headrest speaker 2330b of the second headrest speaker array 2340 to activate. The activated subset of speakers (i.e., the intermediate first headrest speaker 2330b and the intermediate second headrest speaker 2340b) then simultaneously output sound beams toward the player seated in the gaming chair 2000.

In this example embodiment, the EGM and/or the gaming chair 2000 utilizes signal propagation delays and/or level differences to account for the relative positions of the activated speakers of the first headrest speaker array 2330, the second headrest speaker array 2340, and the player head position information. However, it should be appreciated that additional techniques for providing the player with a uniform interaural experience (i.e., controlling for difference between the reception of the sound beams by each ear of the player based on, for example, timing and intensity) may additionally or alternatively be used.

In this illustrated example embodiment, the EGM and/or the gaming chair 2000 selects the plurality of speaker(s) to activate so that the player head is best covered by sound beams output by the first headrest speaker array 2330 and the second headrest speaker array 2340. For example, the EGM and/or the gaming chair 2000 selects, based on the player head position information, to activate a subset of the speaker(s) of the respective headrest speaker arrays 2330 and 2340. For example, based on first player head position information, the EGM and/or the gaming chair 2000 may select zero, one, two, or more of the speakers of the first headrest speaker array 2330 to activate and may select zero, one, two or more of the speakers of the second headrest speaker array 2340 to activate.

The EGM and/or the gaming chair 2000 may then select a different subset of the speaker(s) of the respective headrest speaker arrays 2330 and 2340 to activate based on different (or updated) player head position information. For example, the EGM and/or the gaming chair 2000 may select zero, one, two or more of the speakers of the first headrest speaker array 2330 to activate and may select zero, one, two, or more of the speakers of the second headrest speaker array 2340 to activate based on second player head information.

In this illustrated example embodiment, the subset of the headrest speakers associated with the first player head position information and the subset of the headrest speakers associated with the second player head position information include at least one headrest speaker that is different (e.g., not included in the subset of the headrest speakers associated with the first player head position information or the subset of the headrest speakers associated with the second player head position information).

In certain embodiments, the subset of the headrest speakers associated with the first player head position information and the subset of the headrest speakers associated with the second player head position include a shared (or common) headrest speaker. For example, the EGM and/or the gaming chair 2000 activates the upper first headrest speaker 2330a and the upper headrest second speaker 2340a based on first player head position information, and the EGM and/or the gaming chair 2000 activates the upper first headrest speaker 2330a, the intermediate first headrest speaker 2330b, the upper second headrest speaker 2340a, and the intermediate second headrest speaker 2340b based on second player head position information.

In this illustrated example embodiment, the EGM and/or the gaming chair 2000 activates each of the headrest speakers of a headrest speaker array by associating the different headrest speakers with respective output volumes. For example, the EGM and/or the gaming chair 2000 may activate the first headrest speakers 2330a, 2330b, and 2330c of the first headrest speaker array 2330 by associating the upper first headrest speaker 2330a with a first output volume (e.g., high), associating the intermediate first headrest speaker 2330b with a second output volume (e.g., medium), and associating the lower first headrest speaker 2330c with a third output volume (e.g., low). However, it should be appreciated that in alternative or additional embodiments, the EGM and/or gaming chair 2000 may associate one or more of the headrest speakers with the same output volume (e.g., may associate the upper first headrest speaker 2330a and the intermediate first headrest speaker 2330b with the medium output volume) and/or associate one or more of the headrest speakers with alternate output volumes (e.g., off).

In certain embodiments, the headrest speakers may be positioned at any of different positions that enable the respective headrest speakers to output sound beams. In some such embodiments, the headrest speakers are supported by the headrest 2338. In some such embodiments, one or more of the headrest speakers may not be supported by the headrest 2338. For example, one or more of the headrest speakers may be mounted on a shared topper. In certain embodiments, one or more of the headrest speakers may be mounted to the back side of the housing of the EGM and/or the back side of the headrest 2338.

In certain embodiments, the EGM and/or the gaming chair 2000 utilizes a phase-shifted audio playback system to control the direction (and position) of the output sound beams. In certain embodiments, the EGM and/or the gaming chair 2000 may modulate the time and/or output levels (e.g., volume) of the output sound beams to control the direction (and/or position) of the output sound beams.

V. Gaming Chair—Selectable Sound Beams Using a Plurality of Movable Speakers Movable to Different Positions to Direct Sound Beams at Different Directions Based on the Positions of the Respective Movable Speakers Referring now to FIGS. 10, 11, and 12, another example gaming chair of the present disclosure is generally illustrated and indicated by numeral 3000. The example gaming chair 3000 may be used in conjunction with an EGM, such as the example EGM 100 of FIGS. 1 to 4 and/or the EGM 1100 of FIGS. 6 to 8. This example gaming chair 3000 illustrated in FIGS. 10, 11, and 12 generally includes a frame (not shown), a cushion 3302, and a post 3350 that couples the gaming chair 3000 to a surface, among other components. In this example embodiment, the gaming chair 3000 includes: (a) a headrest 3328 having a front side; (b) a first headrest speaker 3330 supported by the headrest 3328; (c) a second headrest speaker 3340 supported by the headrest 3328; and (d) a processor (not shown) and a memory device (not shown) that co-act or work together with the above-mentioned components to provide selectable sound beams. In this example embodiment, the first headrest speaker 3330 includes a movable speaker that is movable to different positions relative to the front side of the headrest 3328. The first headrest speaker 3330 is configured to direct sound beams at different directions relative to the front side of the headrest 3328 based on the respective position of the first headrest speaker 3330. In this example embodiment, the second headrest speaker 3340 includes a movable speaker that is movable to different positions relative to the front side of the headrest 3328. The second headrest speaker 3340 is configured to direct sound beams at different directions relative to the front side of the headrest 3328 based on the respective position of the second headrest speaker 3340. It should be appreciated that the processor and the memory device may be configured to operate with one or more sound cards to cause the production and output of sound beams by the selected speakers. In some embodiments, the processor and/or the memory device is integrated with the one or more sound cards. In some embodiments, the one or more sound cards are integrated with the first headrest speaker 3330 and/or the second headrest speaker 3340.

It should be appreciated that in certain embodiments, the processor and/or the memory device are external of the headrest 3328 and/or the gaming chair 3000. In some such embodiments, the external processor and/or the external memory device facilitate control of the first headrest speaker 3330 and/or the second headrest speaker 3340.

In some embodiments, the EGM and/or the gaming chair 3000 includes an audio processing module to cause the production and output of sound beams by the selected speakers. In certain embodiments, the audio processing module executes on an external computer (e.g., by an external audio processing engine), may be executed in a cloud or server-based system, may be executed using a series of digital signal processors (DSPs), and/or may be executed using a series of graphics processing units (GPUs).

In this illustrated example embodiment, the first headrest speaker 3330, the second headrest speaker 3340, the processor, and the memory device are configured to produce and output sound beams by operating in real-time or substantially real-time basis to: (a) identify a direction of the first headrest speaker 3330 to direct sound beams based on captured player head position information; (b) identify a direction of the second headrest speaker 3340 to direct sound beams based on the captured player head position information; (c) cause the first headrest speaker 3330 to move to a position relative to the front side of the headrest 3328 based on the identified direction of the first headrest speaker 3330; (d) cause the second headrest speaker 3340 to move to a position relative to the front side of the headrest 3328 based on the identified direction of the second headrest speaker 3340; (e) cause the first headrest speaker 3330 to output a first sound beam associated with audio associated with a play of a game; and (f) cause the second headrest speaker 3340 to output a second sound beam associated with the audio associated with the play of the game.

In this example embodiment, the cushion 3302 of the gaming chair 3000 includes a back portion 3304 and a seat portion 3306. The back portion 3304 includes a front surface 3308, an opposing rear surface 3310, a first side surface 3312, and an opposing second side surface 3314. The back portion 3304 also includes a top surface 3316 and an opposing bottom surface 3318.

In this example embodiment, the seat portion 3306 of the gaming chair 3000 includes a top surface 3320, an opposing bottom surface 3322, a front surface 3324, and an opposing rear surface 3326.

In this example embodiment, the gaming chair 3000 utilizes a head position tracker of the EGM (e.g., the example head position tracker 320 of the EGM 100 and/or the head position tracker 1320 of the EGM 1100) to track the movement of the eyes and/or the head of the player 1. However, it should be appreciated that in certain embodiments, the gaming chair 3000 may alternatively or additionally include a head position tracker. For example, the headrest 3328 may include a camera to track the movement of the head of the player 1. The head position tracker provides player head position information that includes a position (e.g., XYZ coordinates) of the player relative to the front side of the housing of the EGM and/or the front side of the gaming chair 3000.

In this illustrated example embodiment, the first headrest speaker 3330 is supported by the headrest 3328 and positioned to the right-side of the headrest 3328 (looking forward). The first headrest speaker 3330 includes a motorized speaker that is movable to different positions relative to the front side of the headrest 3328. In this illustrated example embodiment, the first headrest speaker 3330 is configured to direct sound beams at different directions relative to the front side of the headrest 3328 based on the respective position of the first headrest speaker 3330. For example, the EGM and/or the gaming chair 3000 may cause the first headrest speaker 3330 to move to a different position to output sound beams in a direction based on player head position information obtained from the player head tracker.

In this illustrated example embodiment, the second headrest speaker 3340 is supported by the headrest 3328 and positioned to the left-side of the headrest 3328 (looking forward). The second headrest speaker 3340 includes a motorized speaker that is movable to different positions relative to the front side of the headrest 3328. In this illustrated example embodiment, the second headrest speaker 3340 is configured to direct sound beams at different directions relative to the front side of the headrest 3328 based on the respective position of the second headrest speaker 3340. For example, the EGM and/or the gaming chair 3000 may cause the second headrest speaker 3340 to move to a different position to output sound beams in a direction based on player head position information obtained from the player head tracker.

While in the illustrated example embodiment the first headrest speaker 3330 and the second headrest speaker 3340 are motorized speakers that are movable to different positions relative to the front side of the headrest 3328, it should be appreciated that other techniques for moving the first headrest speaker 3330 and/or the second headrest speaker 3340 may additionally or alternatively be used. For example, the first headrest speaker 3330 and/or the second headrest speaker 3340 may be an array of fixed angled speakers (such as the headrest speaker arrays 2330 and 2340) that is in communication with a modulator that modulates the array of fixed angles speakers to direct sound beams at different directions relative to the front side of the headrest 3328.

In this illustrated example embodiment, the EGM and/or the gaming chair 3000 selects the position of the first headrest speaker 3330 and the position of the second headrest speaker 3340 so that the player head is best covered by sound beams output by, at least, the first headrest speaker 3330 and the second headrest speaker 3340.

Figure 11:
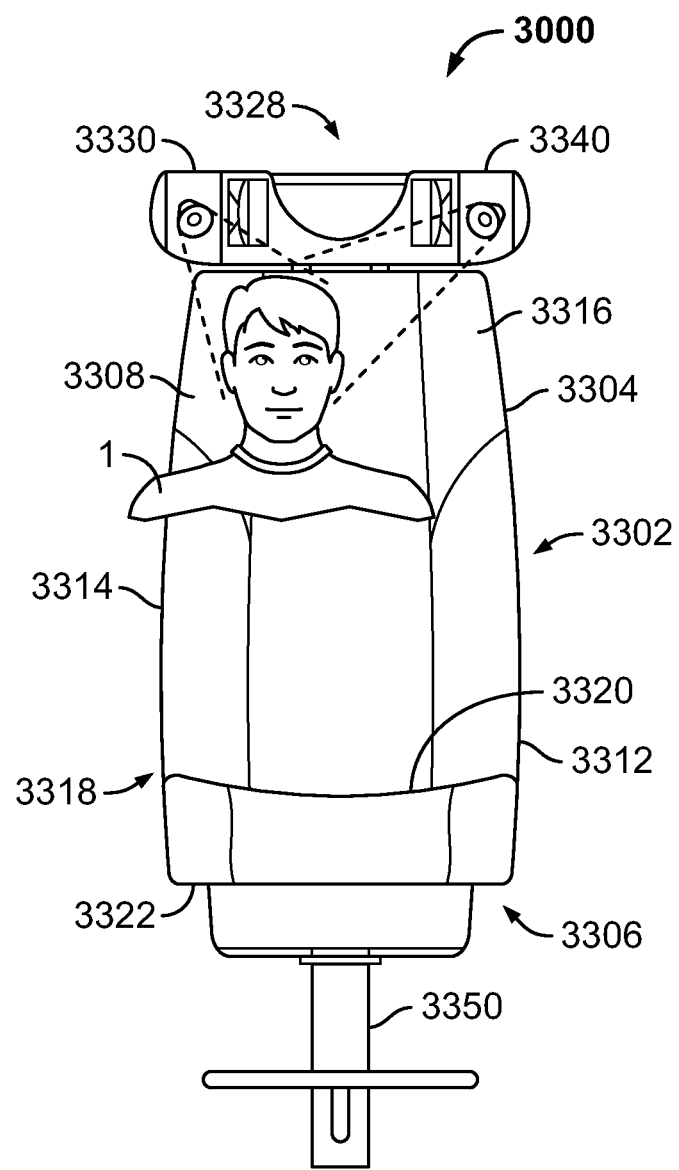
FIG. 11 is a front view of the example gaming chair of FIG. 10 and a fragmentary view of a player sitting in a first position in the chair, and showing, based on first player head position information, the first movable headrest speaker in a first position and the second movable headrest speaker in a first position, wherein the first and second movable headrest speakers in the respective first positions are activated to output sound beams based on the first player head position information.

In this illustrated example embodiment, and as illustrated in FIG. 11, the first headrest speaker 3330 is positioned to output sound beams at a first direction towards the player 1. The second headrest speaker 3340 is positioned to output sound beams at a complementary first angle towards the player 1. In this illustrated example embodiment, the EGM and/or the gaming chair 3000 causes the first headrest speaker 3330 and the second headrest speaker 3340 to move to their respective positions to output their respective sound beams at their first respective directions based on first player head position information.

Figure 12:
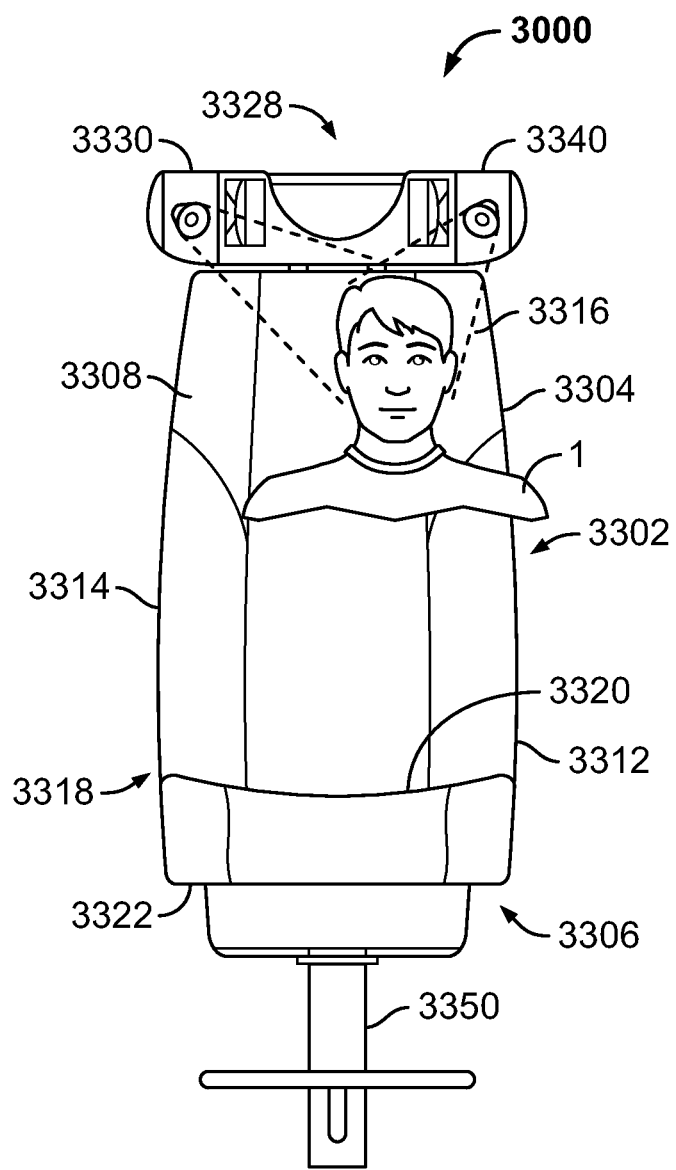
FIG. 12 is a front view of the example gaming chair of FIG. 10 and a fragmentary view of a player sitting in a second position in the chair, and showing, based on second player head position information, the first movable headrest speaker in a second position and the second movable headrest speaker in a second position, wherein the first and second movable headrest speakers in the respective second positions are activated to output sound beams based on the second player head position information.

In this illustrated example embodiment, and as illustrated in FIG. 12, the first headrest speaker 3330 is positioned to output sound beams at a second direction towards the player 1. The second headrest speaker 3340 is positioned to output sound beams at a complementary second angle towards the player 1. In this illustrated example embodiment, the EGM and/or the gaming chair 3000 causes the first headrest speaker 3330 and the second headrest speaker 3340 to move to their respective positions to output their respective sound beams at their second respective directions based on second player head position information.

In this illustrated example embodiment, the first headrest speaker 3330 and the second headrest speaker 3340 are configured to simultaneously output respective sound beams toward the player 1.

In this illustrated example embodiment, the EGM and/or the gaming chair 3000 utilizes signal propagation delays and/or level differences to account for the relative positions of the first headrest speaker 3330, the second headrest speaker 3340, and the player head position information. However, it should be appreciated that additional techniques for providing the player 1 with a uniform interaural experience may additionally or alternatively be used.

In operation, in this example embodiment, the head position tracker captures player head position information (e.g., XYZ coordinates) relative to the front side of the headrest 3328 of the player 1. The EGM and/or the gaming chair 3000 then identifies a direction of the first headrest speaker 3330 and a direction of the second headrest speaker 3340 to direct sound beams based on the captured player head position information. The EGM and/or the gaming chair 3000 then causes the first headrest speaker 3330 and the second headrest speaker 3340 to move to respective positions that facilitate outputting sound beams in the identified directions. When the headrest speakers 3330 and 3340 are set in their respective positions, the EGM and/or the gaming chair 3000 causes the respective headrest speakers 3330 and 3340 to output respective sound beams associated with audio.

Although not shown, it should be appreciated that in certain embodiments, the angled headrest speakers of the headrest speaker arrays 2330 and 2340 of the gaming chair 2000 and the movable headrest speakers 3330 and 3340 of the gaming chair 3000 may be combined. For example, in certain embodiments, a gaming chair includes a first headrest speaker array including a plurality of first angled headrest speakers that are positioned at different angles to direct sound beams at different angles relative to the front side of the headrest of the gaming chair, such as the angled headrest speakers 2330a, 2330b, and 2330c. The first headrest speaker array also includes a first movable headrest speaker that is movable to different positions relative to the front side of the headrest of the gaming chair and that is configured to direct sound beams at different directions relative to the front side of the headrest based on the respective position of the first movable headrest speaker, such as the movable headrest speaker 3330. The gaming chair also includes a second headrest speaker array including a plurality of second angled headrest speakers that are positioned at different angles to direct sound beams at different angles relative to the front side of the headrest of the gaming chair, such as the angled headrest speakers 2340a, 2340b, and 2340c. The second headrest speaker array also includes a second movable headrest speaker that is movable to different positions relative to the front side of the headrest of the gaming chair and that is configured to direct sound beams at different directions relative to the front side of the headrest based on the respective position of the second movable headrest speaker, such as the movable headrest speaker 3340.

In certain such embodiments, the first movable headrest speaker is positioned within the first headrest speaker array and is positioned adjacent to the first angled headrest speakers (e.g., positioned directly above the first angled headrest speakers, positioned directly below the first angled headrest speakers, and/or positioned directly next to one of the first angled headrest speakers). For example, the first headrest speaker array includes one or more angled headrest speakers and one or more movable headrest speakers.

In certain such embodiments, the first movable headrest speaker may be positioned between the first angled headrest speakers within the first headrest speaker array. For example, the first headrest speaker array may include an upper angled headrest speaker, a first movable headrest speaker positioned directly below the upper angled headrest speaker (looking forward), an intermediate angled speaker positioned directly below the first movable headrest speaker (looking forward), and a lower angled headrest speaker positioned directly below the intermediate angled speaker (looking forward). However, it should be appreciated that additional or alternate combinations of the angled headrest speakers and the movable headrest speaker within the first headrest speaker array are also possible.

Similarly, in certain such embodiments, the second movable headrest speaker is positioned within the second headrest speaker array and positioned adjacent to the second angled headrest speakers (e.g., positioned directly above the second angled headrest speakers, positioned directly below the second angled headrest speakers, and/or positioned directly next to one of the second angled headrest speakers). For example, the second headrest speaker array includes one or more angled headrest speakers and one or more movable headrest speakers.

In certain such embodiments, the second movable headrest speaker may be positioned between the second angled headrest speakers within the second headrest speaker array. For example, the second headrest speaker array may include an upper angled headrest speaker, a second movable headrest speaker positioned directly below the upper angled headrest speaker (looking forward), an intermediate angled headrest speaker positioned directly below the second movable headrest speaker (looking forward), and a lower angled headrest speaker positioned directly below the intermediate angled headrest speaker (looking forward). However, it should be appreciated that additional or alternate combinations of the angled headrest speakers and the movable headrest speaker within the second headrest speaker array are also possible.

In certain embodiments, the movable headrest speakers 3330 and 3340 of the gaming chair 3000 may be positioned adjacent to the headrest speaker arrays 2330 and 2340 of the gaming chair 2000. For example, in certain embodiments, a gaming chair includes a first headrest speaker array including a plurality of first angled headrest speakers that are positioned at different angles to direct sound beams at different angles relative to the front side of the headrest of the gaming chair, such as the angled headrest speakers 2330a, 2330b, and 2330c. The gaming chair also includes a first movable headrest speaker that is movable to different positions relative to the front side of the headrest of the gaming chair and that is configured to direct sound beams at different directions relative to the front side of the headrest based on the respective position of the first movable headrest speaker, such as the movable headrest speaker 3330. In certain such embodiments, the gaming chair also includes a second headrest speaker array including a plurality of second angled headrest speakers that are positioned at different angles to direct sound beams at different angles relative to the front side of the headrest of the gaming chair, such as the angled headrest speakers 2340a, 2340b, and 2340c. The gaming chair also includes a second movable headrest speaker that is movable to different positions relative to the front side of the headrest of the gaming chair and that is configured to direct sound beams at different directions relative to the front side of the headrest based on the respective position of the second movable headrest speaker, such as the movable headrest speaker 3340.

In certain such embodiments, the first movable headrest speaker is positioned adjacent to the first headrest speaker array (e.g., positioned directly above the first headrest speaker array, positioned directly below the first headrest speaker array, and/or positioned directly next to the first headrest speaker array) and the second movable headrest speaker is positioned adjacent to the second headrest speaker array (e.g., positioned directly above the second headrest speaker array, positioned directly below the second headrest speaker array, and/or positioned directly next to the second headrest speaker array).

It should be appreciated that in certain embodiments, the quantity of angled headrest speakers and/or movable headrest speakers included in a gaming chair may vary. For example, a headrest speaker array may include zero, one, two, or more angled headrest speakers and also include zero, one, two, or more movable headrest speakers.

It should be appreciated that in certain embodiments, the quantity of movable headrest speakers positioned adjacent to a headrest speaker array may vary. For example, one, two, or more movable headrest speakers may be positioned in a movable headrest speaker array that is positioned adjacent to a headrest speaker array including a plurality of angled headrest speakers.

It should be appreciated that in certain embodiments, the headrest of the gaming chair is movable. For example, the headrest of the gaming chair may be motorized. In certain such embodiments, the EGM and/or the gaming chair may cause the headrest to move to position speakers supported by the headrest to direct sound beans associated with audio towards the player. In certain such embodiments, the speakers supported by the headrest may include one or more angled headrest speakers, one or more movable headrest speakers, and/or a combination of one or more angled headrest speakers and one or more movable headrest speakers.

Figure 6:
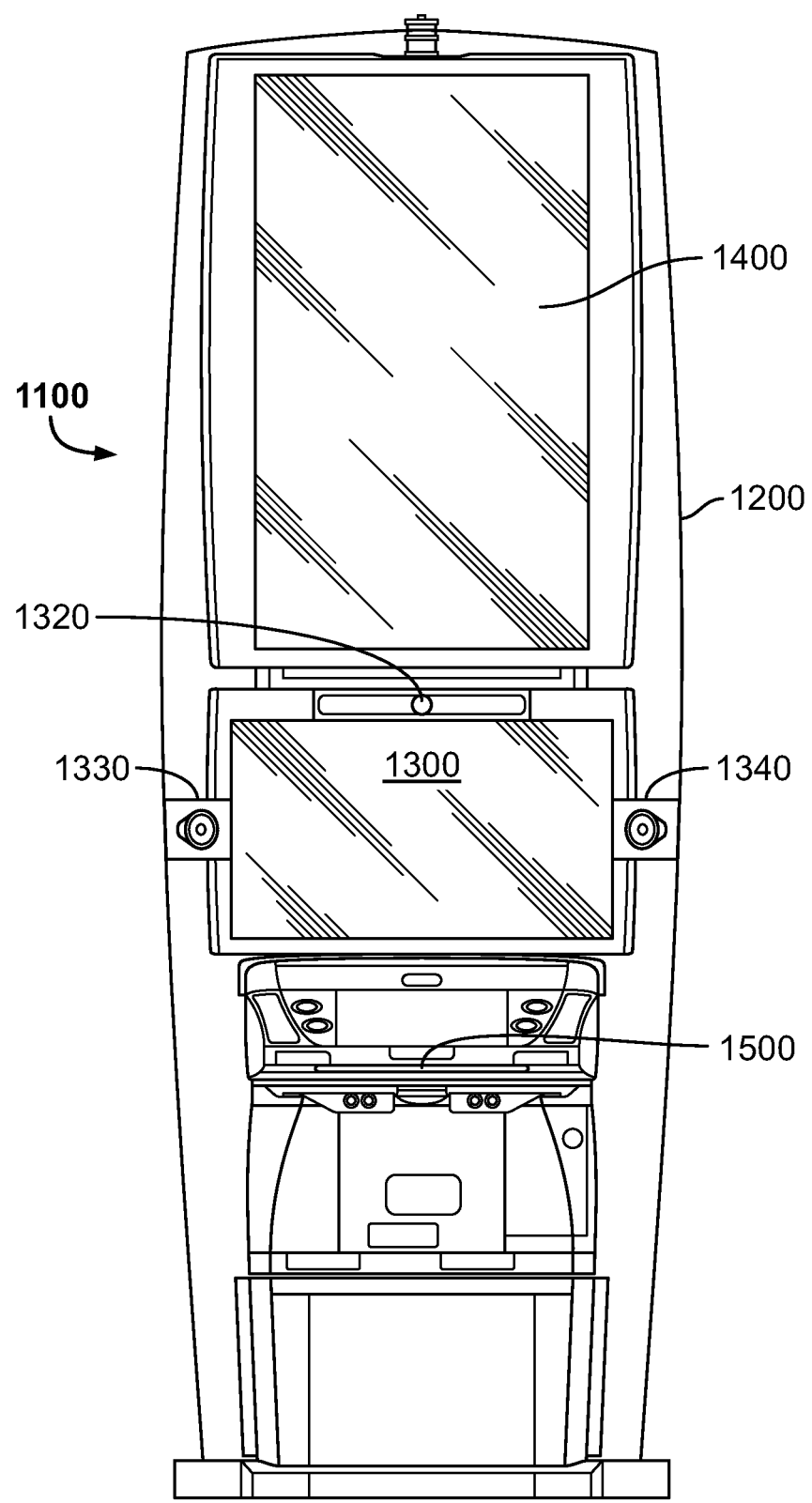
FIG. 6 is a front view of another example embodiment of an EGM of the present disclosure including a plurality of input devices, a plurality of output devices, a first movable speaker, and a second movable speaker.
Figure 9:
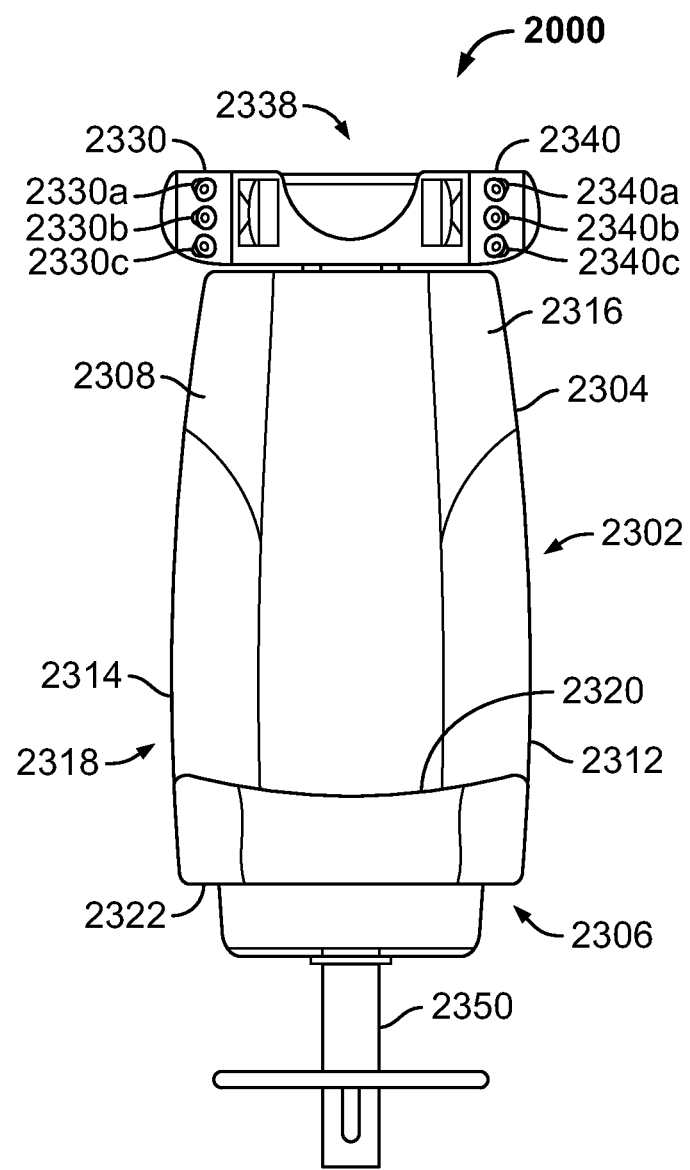
FIG. 9 is a front view of one example embodiment of a gaming chair of the present disclosure that may be used with any of the EGMs of the present disclosure (or other EGMs), and including a headrest, a first headrest speaker array including a plurality of differently angled headrest speakers supported by the headrest, and a second headrest speaker array including a plurality of differently angled headrest speakers supported by the headrest.
Figure 10:
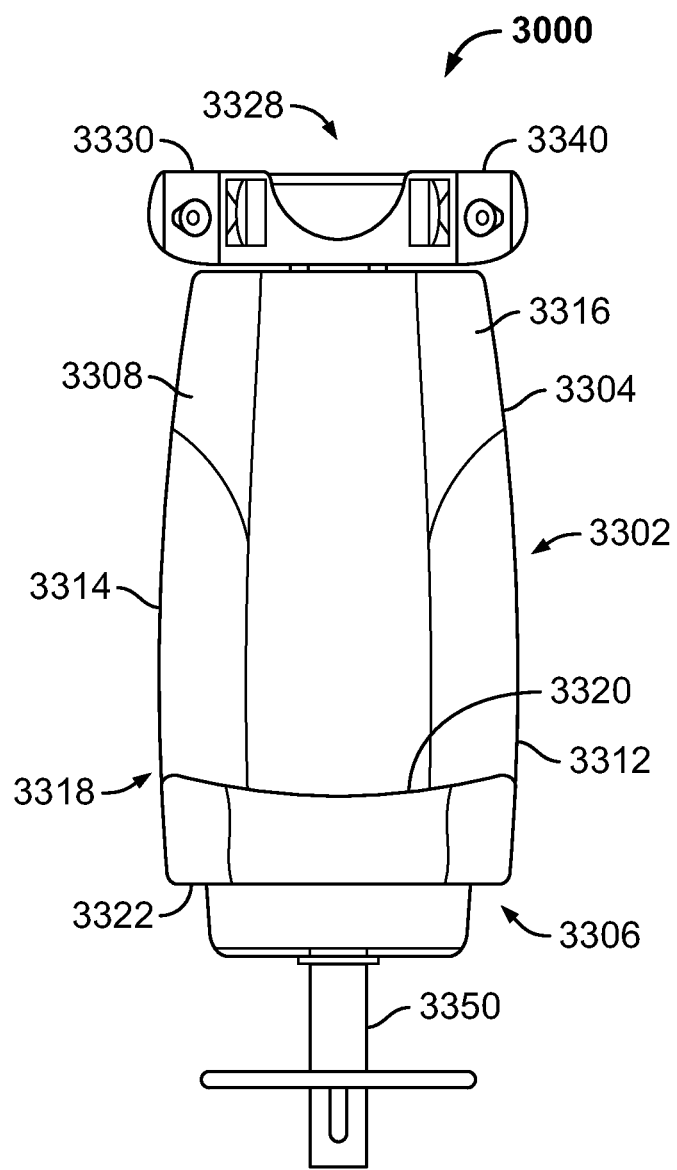
FIG. 10 is a front view of another example embodiment of a gaming chair of the present disclosure that may be used with any of the EGMs of the present disclosure (or other EGMs), and including headrest, a first movable headrest speaker supported by the headrest, and a second movable headrest speaker supported by the headrest.

It should be appreciated that certain embodiments of the present disclosure include a gaming system including an EGM, such as the example EGM 100 of FIGS. 1 to 4 or the example EGM 1100 of FIGS. 6 to 8, and a gaming chair, such as the example gaming chair 2000 of FIG. 9 or the example gaming chair of FIGS. 10 to 12. For example, the EGM of the electronic gaming system may include one or more angled speakers (such as the example EGM 100), one or more movable speakers (such as the example EGM 1100), and/or a combination of one or more angled speakers and one or more movable speakers. The gaming chair of the electronic gaming system may include one or more angled headrest speakers (such as the example gaming chair 2000), one or more movable headrest speakers (such as the example gaming chair 3000), and/or a combination of one or more angled speakers and one or more movable speakers.

In certain embodiments, the EGM and/or the gaming chair 2000 utilizes a phase-shifted audio playback system to control the direction (and position) of the output sound beams. In certain embodiments, the EGM and/or the gaming chair 2000 may modulate the time and/or output levels (e.g., volume) of the output sound beams to control the direction (and/or position) of the output sound beams.

Figure 13:
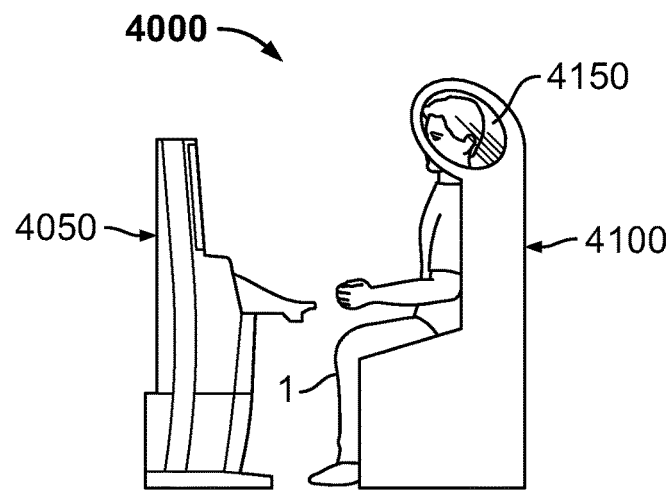
FIG. 13 is a side view of an example embodiment of an electronic gaming system of the present disclosure including any of the EGMs of the present disclosure (or other EGMs), and showing another example embodiment of a gaming chair of the present disclosure that includes a first plurality of sound lenses.

VI. Gaming Chair—Redirecting Sound Beams Using Sound Lenses Connected to the Gaming Chair Referring now to FIG. 13, an example electronic gaming system of the present disclosure is generally illustrated and indicated by number 4000. The example electronic gaming system 4000 includes an EGM 4050 and a gaming chair 4100. The example electronic gaming system 4000 may be used in conjunction with any of the EGMs of the present disclosure, such as the example EGM 100 of FIGS. 1 to 4, the example EGM 1100 of FIGS. 6 to 8, or any other EGM. The example electronic gaming system 4000 may be used in conjunction with any of the gaming chairs of the present disclosure, such as the example gaming chair 2000 of FIG. 9, the example gaming chair 3000 of FIGS. 10 to 12, or any other gaming chair.

In the illustrated example embodiment, the gaming chair 4100 includes a plurality of sound lenses 4150 connected to the gaming chair 4100. The plurality of sound senses 4150 are positioned with respect to the gaming chair 4100 to surround the head of the player sitting in the gaming chair 4100. In this illustrated example embodiment, the plurality of sound lenses 4150 are made at least in part from an acoustic meta-surface to transmit relatively focused sound beams (to amplify sounds) and/or to block sound beams. In certain embodiments, the acoustic meta-surfaces are flat synthetic materials designed using building blocks (e.g., sequences of gases, such as argon and xenon, layered) smaller than the wavelength of sound. In certain embodiments, the acoustic meta-surfaces are convex lenses. In certain embodiments, one or more portions of the plurality of sound lenses 4150 are made of a transparent material, a semi-transparent material, and/or an opaque material.

In certain embodiments, the plurality of sound lenses 4150 facilitate noise-canceling features. For example, the plurality of sound lenses 4150 may be positioned with respect to the gaming chair 4100 to block sound beams emitted from one or more locations other than the EGM 4050 reaching the head of the player seated in the gaming chair 4100. That is, in certain such embodiments, the plurality of sound lenses 4150 move certain sound beams away from the head of the player.

In certain embodiments, the plurality of sound lenses 4150 facilitate noise-focusing features. For example, the plurality of sound lenses 4150 may be positioned with respect to the gaming chair 4100 to focus sound beams emitted by the EGM 4050 toward the player seated in the gaming chair 4100. That is, in certain such embodiments, the plurality of sound lenses 4150 move certain sound beams towards the head of the player.

In certain embodiments, the plurality of sound lenses 4150 are motorized. For example, the EGM 4050 and/or the gaming chair 4100 may move the position of the plurality of sound lenses 4150. In certain such embodiments, the EGM 4050 and/or the gaming chair 4100 may cause the plurality of sound lenses 4150 to move to a position to facilitate the noise-canceling feature of the sound lenses 4150. For example, the EGM 4050 and/or the gaming chair 4100 may detect a sound beam directed towards the head of the player seated in the gaming chair 4100. In response to the detected sound beam, the EGM 4050 and/or the gaming chair 4100 may cause the plurality of sound lenses 4150 to move to a position to direct the detected sound beam away from the head of the player seated in the gaming chair 4100.

In certain embodiments, the EGM 4050 and/or the gaming chair 4100 may cause the plurality of sound lenses 4150 to move to a position to facilitate the noise-focusing feature of the sound lenses 4150. For example, the EGM 4050 and/or the gaming chair 4100 may detect a sound beam output by a speaker of the EGM 4050. In response to the detected sound beam, the EGM 4050 and/or the gaming chair 4100 may cause the plurality of sound lenses 4150 to move to a position to direct the detected sound beam towards the head of the player seated in the gaming chair 4100.

In certain embodiments, the plurality of sound lenses 4150 are manually movable. For example, a player may adjust the position of the plurality of sound lenses 4150 to facilitate the noise-canceling feature of the sounds lenses 4150 and/or the noise-focusing feature of the sound lenses.

In certain embodiments, the EGM 4050 and/or the gaming chair 4100 may enable the player to select whether they prefer to have the noise-canceling feature of the sound lenses 4150 activated or to have the noise-focusing feature of the sound lenses 4150 activated. The EGM 4050 and/or the gaming chair 4100 may then cause the sound lenses 4150 to move to a position based on the player preference.

Figure 14:
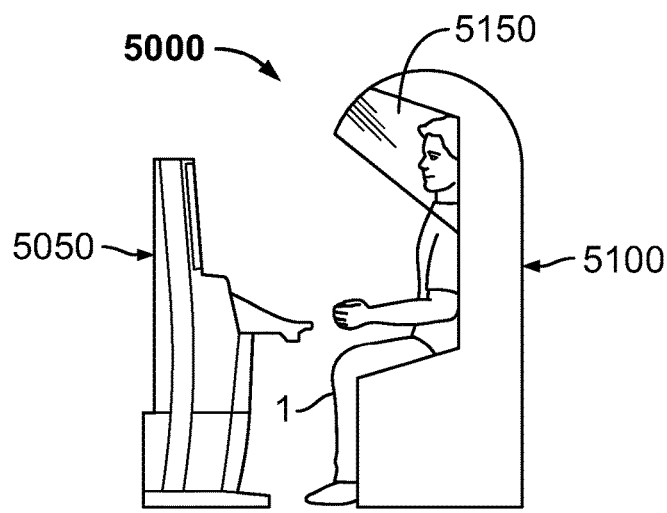
FIG. 14 is a side view of another example embodiment of an electronic gaming system of the present disclosure including any of the EGMs of the present disclosure (or other EGMs), and showing another example embodiment of a gaming chair of the present disclosure that includes a second plurality of sound lenses.

Referring now to FIG. 14, another example electronic gaming system of the present disclosure is generally illustrated and indicated by number 5000. The example electronic gaming system 5000 includes an EGM 5050 and a gaming chair 5100. The example electronic gaming system 5000 may be used in conjunction with any of the EGMs of the present disclosure, such as the example EGM 100 of FIGS. 1 to 4, the example EGM 1100 of FIGS. 6 to 8, or any other EGM. The example electronic gaming system 5000 may be used in conjunction with any of the gaming chairs of the present disclosure, such as the example gaming chair 2000 of FIG. 9, the example gaming chair 3000 of FIGS. 10 to 12, or any other gaming chair.

In the illustrated example embodiment, the gaming chair 5100 includes a plurality of sound lenses 5150 connected to the gaming chair 5100. The plurality of sound senses 5150 are positioned with respect to the gaming chair 5100 to surround the head of the player sitting in the gaming chair 5100. In this illustrated example embodiment, the plurality of sound lenses 5150 are made at least in part from an acoustic meta-surface to transmit relatively focused sound beams (to amplify sounds) and/or to block sound beams. In certain embodiments, the acoustic meta-surfaces are flat synthetic materials designed using building blocks (e.g., sequences of gases, such as argon and xenon, layered) smaller than the wavelength of sound. In certain embodiments, the acoustic meta-surfaces are convex lenses. In certain embodiments, one or more portions of the plurality of sound lenses 5150 are made of a transparent material, a semi-transparent material, and/or an opaque material.

In certain embodiments, the plurality of sound lenses 5150 facilitate noise-canceling features. For example, the plurality of sound lenses 5150 may be positioned with respect to the gaming chair 5100 to block sound beams emitted from a location other than the EGM 5050 reaching the head of the player seated in the gaming chair 5100. That is, in certain such embodiments, the plurality of sound lenses 5150 move certain sound beams away from the head of the player.

In certain embodiments, the plurality of sound lenses 5150 facilitate noise-focusing features. For example, the plurality of sound lenses 5150 may be positioned with respect to the gaming chair 5100 to focus sound beams emitted by the EGM 5050 toward the player seated in the gaming chair 5100. That is, in certain embodiments, the plurality of sound lenses 5150 move certain sound beams towards the head of the player.

In certain embodiments, the plurality of sound lenses 5150 are motorized. For example, the EGM 5050 and/or the gaming chair 5100 may move the position of the plurality of sound lenses 5150. In certain such embodiments, the EGM 5050 and/or the gaming chair 5100 may cause the plurality of sound lenses 5150 to move to a position to facilitate the noise-canceling feature of the sound lenses 5150. For example, the EGM 5050 and/or the gaming chair 5100 may detect a sound beam directed towards the head of the player seated in the gaming chair 5100. In response to the detected sound beam, the EGM 5050 and/or the gaming chair 5100 may cause the plurality of sound lenses 5150 to move to a position to direct the detected sound beam away from the head of the player seated in the gaming chair 5100.

In certain embodiments, the EGM 5050 and/or the gaming chair 5100 may cause the plurality of sound lenses 5150 to move to a position to facilitate the noise-focusing feature of the sound lenses 5150. For example, the EGM 5050 and/or the gaming chair 5100 may detect a sound beam output by a speaker of the EGM 5050. In response to the detected sound beam, the EGM 5050 and/or the gaming chair 5100 may cause the plurality of sound lenses 5150 to move to a position to direct the detected sound beam towards the head of the player seated in the gaming chair 5100.

In certain embodiments, the plurality of sound lenses 5150 are manually movable. For example, a player may adjust the position of the plurality of sound lenses 5150 to facilitate the noise-canceling feature of the sounds lenses 5150 and/or the noise-focusing feature of the sound lenses.

In certain embodiments, the EGM 5050 and/or the gaming chair 5100 may enable the player to select whether they prefer to have the noise-canceling feature of the sound lenses 5150 activated or to have the noise-focusing feature of the sound lenses 5150 activated. The EGM 5050 and/or the gaming chair 5100 may then cause the sound lenses 5150 to move to a position based on the player preference.

Figure 15:
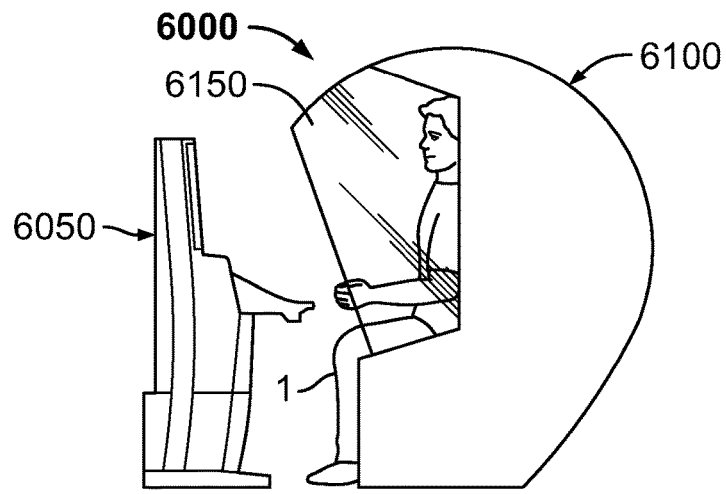
FIG. 15 is a side view of another example embodiment of an electronic gaming system of the present disclosure including any of the EGMs of the present disclosure (or other EGMs), and showing another example embodiment of a gaming chair of the present disclosure that includes a third plurality of sound lenses.

Referring now to FIG. 15, another example electronic gaming system of the present disclosure is generally illustrated and indicated by number 6000. The example electronic gaming system 6000 includes an EGM 6050 and a gaming chair 6100. The example electronic gaming system 6000 may be used in conjunction with any of the EGMs of the present disclosure, such as the example EGM 100 of FIGS. 1 to 4, the example EGM 1100 of FIGS. 6 to 8, or any other EGM. The example electronic gaming system 6000 may be used in conjunction with any of the gaming chairs of the present disclosure, such as the example gaming chair 2000 of FIG. 9, the example gaming chair 3000 of FIGS. 10 to 12, or any other gaming chair.

In the illustrated example embodiment, the gaming chair 6100 includes a plurality of sound lenses 6150 connected to the gaming chair 6100. The plurality of sound senses 6150 are positioned with respect to the gaming chair 6100 to surround the head of the player sitting in the gaming chair 6100. In this illustrated example embodiment, the plurality of sound lenses 6150 are made at least in part from an acoustic meta-surface to transmit relatively focused sound beams (to amplify sounds) and/or to block sound beams. In certain embodiments, the acoustic meta-surfaces are flat synthetic materials designed using building blocks (e.g., sequences of gases, such as argon and xenon, layered) smaller than the wavelength of sound. In certain embodiments, the acoustic meta-surfaces are convex lenses. In certain embodiments, one or more portions of the plurality of sound lenses 6150 are made of a transparent material, a semi-transparent material, and/or an opaque material.

In certain embodiments, the plurality of sound lenses 6150 facilitate noise-canceling features. For example, the plurality of sound lenses 6150 may be positioned with respect to the gaming chair 6100 to block sound beams emitted from a location other than the EGM 6050 reaching the head of the player seated in the gaming chair 6100. That is, in certain such embodiments, the plurality of sound lenses 6150 move certain sound beams away from the head of the player.

In certain embodiments, the plurality of sound lenses 6150 facilitate noise-focusing features. For example, the plurality of sound lenses 6150 may be positioned with respect to the gaming chair 6100 to focus sound beams emitted by the EGM 6050 toward the player seated in the gaming chair 6100. That is, in certain such embodiments, the plurality of sound lenses 6150 move certain sound beams towards the head of the player.

In certain embodiments, the plurality of sound lenses 6150 are motorized. For example, the EGM 6050 and/or the gaming chair 6100 may move the position of the plurality of sound lenses 6150. In certain such embodiments, the EGM 6050 and/or the gaming chair 6100 may cause the plurality of sound lenses 6150 to move to a position to facilitate the noise-canceling feature of the sound lenses 6150. For example, the EGM 6050 and/or the gaming chair 6100 may detect a sound beam directed towards the head of the player seated in the gaming chair 6100. In response to the detected sound beam, the EGM 6050 and/or the gaming chair 6100 may cause the plurality of sound lenses 6150 to move to a position to direct the detected sound beam away from the head of the player seated in the gaming chair 6100.

In certain embodiments, the EGM 6050 and/or the gaming chair 6100 may cause the plurality of sound lenses 6150 to move to a position to facilitate the noise-focusing feature of the sound lenses 6150. For example, the EGM 6050 and/or the gaming chair 6100 may detect a sound beam output by a speaker of the EGM 6050. In response to the detected sound beam, the EGM 6050 and/or the gaming chair 6100 may cause the plurality of sound lenses 6150 to move to a position to direct the detected sound beam towards the head of the player seated in the gaming chair 6100.

In certain embodiments, the plurality of sound lenses 6150 are manually movable. For example, a player may adjust the position of the plurality of sound lenses 6150 to facilitate the noise-canceling feature of the sounds lenses 6150 and/or the noise-focusing feature of the sound lenses.

In certain embodiments, the EGM 6050 and/or the gaming chair 6100 may enable the player to select whether they prefer to have the noise-canceling feature of the sound lenses 6150 activated or to have the noise-focusing feature of the sound lenses 6150 activated. The EGM 6050 and/or the gaming chair 6100 may then cause the sound lenses 6150 to move to a position based on the player preference.

VII. EGM—General Components and Operation

The EGM of the present disclosure can be controlled locally by one or more processors, and/or remotely or partially remotely by one or more remote processors, central servers, central controllers, or remote host. In various embodiments, the EGM of the present disclosure can be part of a gaming system (which is also part of the present disclosure) that includes one or more EGMs in combination with one or more remote processors, central servers, central controllers, or remote hosts. In such embodiments, the EGM is configured to communicate with the remote processors, central servers, central controllers, or remote hosts through a data network or remote communication link. In certain such embodiments, the EGM is configured to communicate with one or more other EGMs through the same data network or remote communication link or through a different data network or remote communication link.

In certain embodiments in which the gaming system includes an EGM in combination with a remote processor, central server, central controller, or remote host, the remote processor, central server, central controller, or remote host is any suitable computing device that includes at least one processor and at least one memory device or data storage device. As further described herein, the EGM includes at least one EGM processor configured to transmit and receive data or signals representing events, messages, commands, or any other suitable information between the EGM and the remote processor, central server, central controller, or remote host. The at least one processor of that EGM is configured to execute the events, messages, or commands represented by such data or signals in conjunction with the operation of the EGM. Moreover, the at least one processor of the remote processor, central server, central controller, or remote host is configured to transmit and receive data or signals representing events, messages, commands, or any other suitable information between the remote processor, central server, central controller, or remote host and the EGM. One, more than one, or each of the functions of the at least one processor of the EGM may be performed by the remote processor, the central server, the central controller, or the remote host.

In certain such embodiments, computerized instructions for controlling any games (such as any primary or base games and/or any secondary or bonus games) displayed by the EGM are executed by the remote processor, central server, central controller, or remote host. In such "thin client" embodiments, the remote processor, central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the remote processor, central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a remote processor, central server, central controller, or remote host, computerized instructions for controlling any primary or base games displayed by the EGM are communicated from the remote processor, central server, central controller, or remote host to the EGM in a thick client configuration, and computerized instructions for controlling any secondary or bonus games or other functions displayed by the EGM are executed by the remote processor, central server, central controller, or remote host in a thin client configuration.

In certain embodiments in which the gaming system includes: (a) an EGM configured to communicate with a remote processor, central server, central controller, or remote host through a data network; and/or (b) a plurality of EGMs configured to communicate with one another through a data network, the data network is a local area network (LAN) in which the EGMs are located substantially proximate to one another and/or the remote processor, central server, central controller, or remote host. In one example, the EGMs and the remote processor, central server, central controller, or remote host are located in a gaming establishment or a portion of a gaming establishment.

In other embodiments in which the gaming system includes: (a) an EGM configured to communicate with a remote processor, central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the remote processor, central server, central controller, or remote host. For example, one or more of the EGMs are located: (a) in an area of a gaming establishment different from an area of the gaming establishment in which the remote processor, central server, central controller, or remote host is located; or (b) in a gaming establishment different from the gaming establishment in which the remote processor, central server, central controller, or remote host is located. In another example, the remote processor, central server, central controller, or remote host is not located within a gaming establishment in which the EGMs are located. In certain embodiments in which the data network is a WAN, the gaming system includes a remote processor, central server, central controller, or remote host and an EGM each located in a different gaming establishment in a same geographic area, such as a same city or a same state. Gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a remote processor, central server, central controller, or remote host through a data network; and/or (b) a plurality of EGMs configured to communicate with one another through a data network, the data network is an internet (such as the Internet) or an intranet. In certain such embodiments, an Internet browser of the EGM is usable to access an Internet game page from any location where an Internet connection is available. In one such embodiment, after the EGM accesses the Internet game page, the remote processor, central server, central controller, or remote host identifies a player prior to enabling that player to place any wagers on any plays of any wagering games. In one example, the remote processor, central server, central controller, or remote host identifies the player by requiring a player account of the player to be logged into via an input of a unique username and password combination assigned to the player. The remote processor, central server, central controller, or remote host may, however, identify the player in any other suitable manner, such as: by validating a player tracking identification number associated with the player; by reading a player tracking card or other smart card inserted into a card reader (as described below); by validating a unique player identification number associated with the player by the remote processor, central server, central controller, or remote host; or by identifying the EGM, such as by identifying the MAC address or the IP address of the Internet facilitator. In various embodiments, once the remote processor, central server, central controller, or remote host identifies the player, the remote processor, central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The remote processor, central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 16:
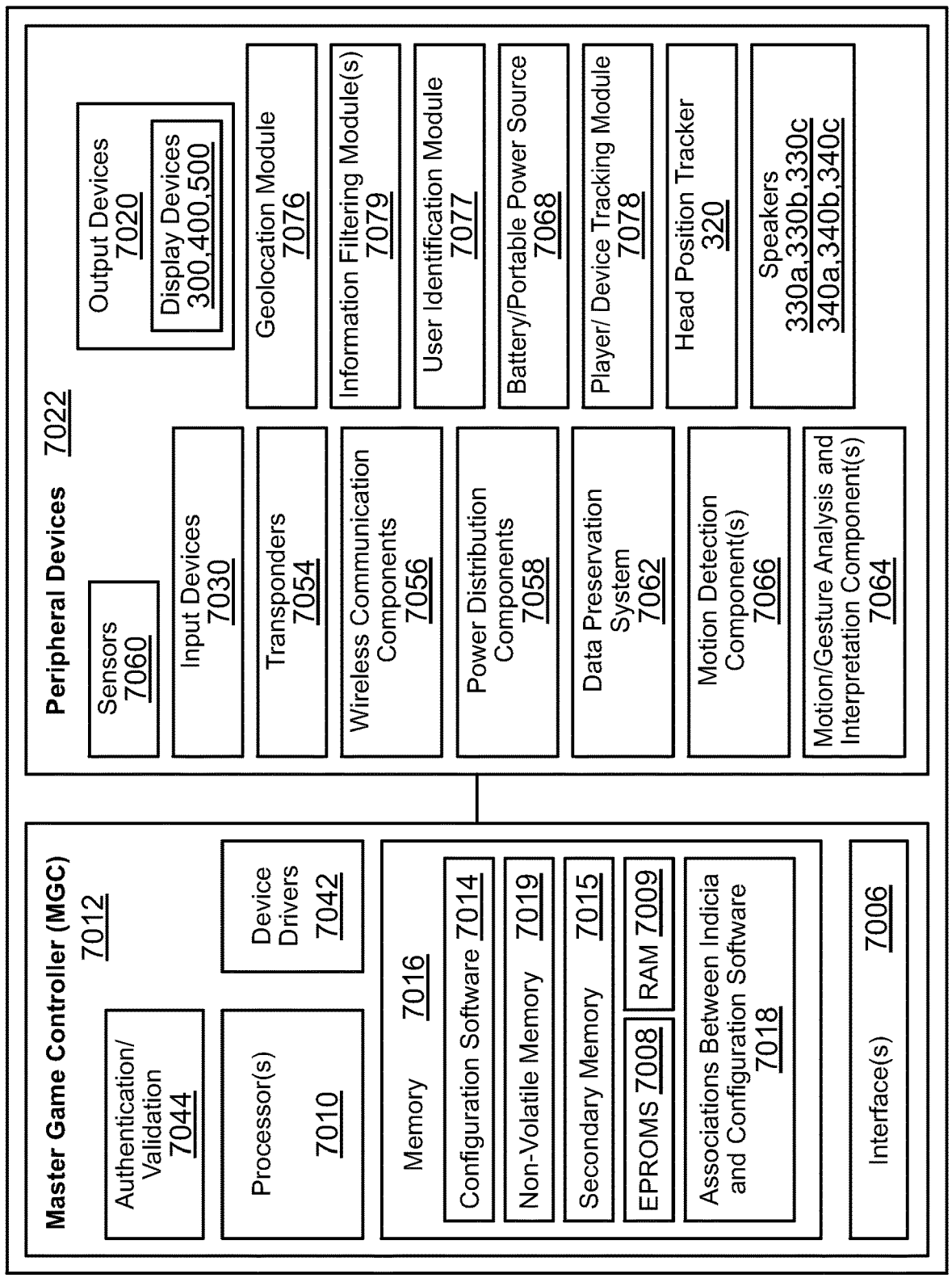
FIG. 16 is a schematic block diagram of one example embodiment of the electronic configuration of one example EGM of the present disclosure.

Referring now to FIG. 16, in various embodiments, the EGM 7000 includes a master gaming controller 7012 configured to communicate with and to operate with a plurality of peripheral devices 7022 (in addition to and including the above described devices 320, 330, 340, 1320, 1330, and 1340).

The master gaming controller 7012 includes at least one processor 7010. The at least one processor 7010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 7006 of the master gaming controller 7012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 7022 (such as input/output devices); and/or (5) controlling the peripheral devices 7022. In certain embodiments, one or more components of the master gaming controller 7012 (such as the at least one processor 7010) reside within a housing of the EGM (described below), while in other embodiments at least one component of the master gaming controller 7012 resides outside of the housing of the EGM.

The master gaming controller 7012 also includes at least one memory device 7016, which includes: (1) volatile memory (e.g., RAM 7009, which can include non-volatile RAM, magnetic RAM, ferroelectric RAM, and any other suitable forms); (2) non-volatile memory 7019 (e.g., disk memory, FLASH memory, EPROMs, EEPROMs, memristor-based non-volatile solid-state memory, etc.); (3) unalterable memory (e.g., EPROMs 7008); (4) read-only memory; and/or (5) a secondary memory storage device 7015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 7016 resides within the housing of the EGM (described below), while in other embodiments at least one component of the at least one memory device 7016 resides outside of the housing of the EGM.

The at least one memory device 7016 is configured to store, for example: (1) configuration software 7014, such as all the parameters and settings for a game playable on the EGM; (2) associations 7018 between configuration indicia read from an EGM with one or more parameters and settings; (3) communication protocols configured to enable the at least one processor 7010 to communicate with the peripheral devices 7022–7022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 7012 communicates with other devices using a serial communication protocol. A few non-limiting examples of serial communication protocols that other devices, such as peripherals (e.g., a bill validator or a ticket printer), may use to communicate with the master game controller 7012 include USB, RS-232, and Netplex (a proprietary protocol developed by IGT).

In certain embodiments, the at least one memory device 7016 is configured to store program code and instructions executable by the at least one processor of the EGM to control the EGM. The at least one memory device 7016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 7016 also stores a plurality of device drivers 7042. Examples of different types of device drivers include device drivers for EGM components and device drivers for the peripheral components 7022. Typically, the device drivers 7042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™ near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 7016 can be upgraded as needed. For instance, when the at least one memory device 7016 is a hard drive, new games, new game options, new parameters, new settings for existing parameters, new settings for new parameters, new device drivers, and new communication protocols can be uploaded to the at least one memory device 7016 from the master game controller 7012 or from some other external device. As another example, when the at least one memory device 7016 includes a CD/DVD drive including a CD/DVD configured to store game options, parameters, and settings, the software stored in the at least one memory device 7016 can be upgraded by replacing a first CD/DVD with a second CD/DVD. In yet another example, when the at least one memory device 7016 uses flash memory 7019 or EPROM 7008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In certain embodiments, the at least one memory device 7016 also stores authentication and/or validation components 7044 configured to authenticate/validate specified EGM components and/or information, such as hardware components, software components, firmware components, peripheral device components, user input device components, information received from one or more user input devices, information stored in the at least one memory device 7016, etc. Examples of various authentication and/or validation components are described in U.S. Pat. No. 6,620,047, entitled "Electronic Gaming Apparatus Having Authentication Data Sets."

In certain embodiments, in addition to the input, output and other components described in the first section above, the peripheral devices 7022 include several device interfaces, such as: (1) at least one output device 7020 including at least one display device 7035; (2) at least one input device 7030 (which may include contact and/or non-contact interfaces); (3) at least one transponder 7054; (4) at least one wireless communication component 7056; (5) at least one wired/wireless power distribution component 7058; (6) at least one sensor 7060; (7) at least one data preservation component 7062; (8) at least one motion/gesture analysis and interpretation component 7064; (9) at least one motion detection component 7066; (10) at least one portable power source 7068; (11) at least one geolocation module 7076; (12) at least one user identification module 7077; (13) at least one player/device tracking module 7078; and (14) at least one information filtering module 7079.

The at least one output device 7020 includes at least one display device 7035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 100 illustrated in FIG. 1 includes a first display device 300, a player tracking display, a credit display, and a bet display.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 7020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGM 100 and illustrated in FIG. 1 may include a ticket printer and dispenser. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method."

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 7020 includes one or more sound generating devices controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGM 100 illustrated in FIG. 1 includes a plurality of speakers. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 7030 may include any suitable device that enables an input signal to be produced and received by the at least one processor 7010 of the EGM.

In one embodiment, the at least one input device 7030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGM 100 illustrated in FIG. 1 may include a combined bill and ticket acceptor and a coin slot.

In one embodiment, the at least one input device 7030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device 7030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 7030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGM 100 illustrated in FIG. 1 may include a game play activation device in the form of a game play initiation button. In other embodiments, the EGM begins game play automatically upon appropriate funding rather than upon utilization of the game play activation device.

In other embodiments, the at least one input device 7030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGM 100 illustrated in FIG. 1 may include a cashout device in the form of a cashout button.

In various embodiments, the at least one input device includes a plurality of buttons that are programmable by the EGM operator to, when actuated, cause the EGM to perform particular functions. For instance, such buttons may be hard keys, programmable soft keys, or icons displayed on a display device of the EGM (described below) that are actuatable via a touch screen of the EGM (described below) or via use of a suitable input device of the EGM (such as a mouse or a joystick). The example EGM 100 illustrated in FIG. 1 may include a plurality of such buttons.

In certain embodiments, the at least one input device 7030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 7030 includes a card reader in communication with the at least one processor of the EGM. The example EGM 100 illustrated in FIG. 1 may include a card reader. The card reader is configured to read a player identification card inserted into the card reader.

The at least one wireless communication component 7056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 7056 transmits electrical, electromagnetic, or optical signals that carry digital data streams or analog signals representing various types of information.

The at least one wired/wireless power distribution component 7058 includes components or devices that are configured to provide power to other devices. For example, in one embodiment, the at least one power distribution component 7058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 7058 is configured to distribute power to one or more internal components of the EGM, such as one or more rechargeable power sources (e.g., rechargeable batteries) located at the EGM.

In certain embodiments, in addition to the components described in the first section above, the at least one sensor 7060 includes at least one of: optical sensors, pressure sensors, RF sensors, infrared sensors, image sensors, thermal sensors, and biometric sensors. The at least one sensor 7060 may be used for a variety of functions, such as: detecting movements and/or gestures of various objects within a predetermined proximity to the EGM (in addition to the detections described above); detecting the presence and/or identity of various persons (e.g., players, casino employees, etc.), devices (e.g., user input devices), and/or systems within a predetermined proximity to the EGM.

The at least one data preservation component 7062 is configured to detect or sense one or more events and/or conditions that, for example, may result in damage to the EGM and/or that may result in loss of information associated with the EGM. Additionally, the data preservation system 7062 may be operable to initiate one or more appropriate action(s) in response to the detection of such events/conditions.

In addition to the player tracker described above, the EGM of the present disclosure can also include at least one motion/gesture analysis and interpretation component 7064 configured to analyze and/or interpret information relating to detected player movements and/or gestures to determine appropriate player input information relating to the detected player movements and/or gestures. For example, in one embodiment, the at least one motion/gesture analysis and interpretation component 7064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 7068 enables the EGM 7000 to operate in a mobile environment. For example, in one embodiment, the EGM 100 includes one or more rechargeable batteries.

The at least one geolocation module 7076 is configured to acquire geolocation information from one or more remote sources and use the acquired geolocation information to determine information relating to a relative and/or absolute position of the EGM. For example, in one implementation, the at least one geolocation module 7076 is configured to receive GPS signal information for use in determining the position or location of the EGM. In another implementation, the at least one geolocation module 7076 is configured to receive multiple wireless signals from multiple remote devices (e.g., EGMs, servers, wireless access points, etc.) and use the signal information to compute position/location information relating to the position or location of the EGM.

The at least one user identification module 7077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 7079 is configured to perform filtering (e.g., based on specified criteria) of selected information to be displayed at one or more displays 7035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

In certain embodiments, the EGM is a device that has obtained approval from a regulatory gaming commission, and in other embodiments, the EGM is a device that has not obtained approval from a regulatory gaming commission.

The EGMs described above are merely examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (sometimes referred to herein as "primary games") and/or any secondary or bonus games or other functions (sometimes referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a remote processor, central server, central controller, or remote host and a changeable EGM, the at least one memory device of the remote processor, central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the remote processor, central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the EGM randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the EGM generates the game outcome(s) and/or the award(s) to be provided based on the associated probabilities. In these embodiments, since the EGM generates game outcomes and/or awards randomly or based on one or more probability calculations, there is no certainty that the EGM will ever provide any specific game outcome and/or award.

In certain embodiments, the EGM maintains one or more predetermined pools or sets of predetermined game outcomes and/or awards. In certain such embodiments, upon generation or receipt of a game outcome and/or award request, the EGM independently selects one of the predetermined game outcomes and/or awards from the one or more pools or sets. The EGM flags or marks the selected game outcome and/or award as used. Once a game outcome or an award is flagged as used, it is prevented from further selection from its respective pool or set; that is, the EGM does not select that game outcome or award upon another game outcome and/or award request. The EGM provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game."

In certain embodiments, the EGM determines a predetermined game outcome and/or award based on the results of a bingo, keno, or lottery game. In certain such embodiments, the EGM utilizes one or more bingo, keno, or lottery games to determine the predetermined game outcome and/or award provided for a primary game and/or a secondary game. The EGM is provided or associated with a bingo card. Each bingo card consists of a matrix or array of elements, wherein each element is designated with separate indicia. After a bingo card is provided, the EGM randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern."

In certain embodiments in which the EGM is configured to communicate with the remote processor, central server, central controller, or remote host for monitoring purposes only. In such embodiments, the EGM determines the game outcome(s) and/or award(s) to be provided in any of the manners described above, and the remote processor, central server, central controller, or remote host monitors the activities and events occurring on the EGM. In one such embodiment, the EGM includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the EGM includes one or more executable game programs executable by at least one processor of the EGM to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the EGM includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the EGM. In certain such embodiments, the EGM includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The EGM enables a wager to be placed on one or more of such paylines to activate such paylines. In other embodiments in which one or more paylines are formed between at least two adjacent symbol display areas, the EGM enables a wager to be placed on a plurality of symbol display areas, which activates those symbol display areas.

In various embodiments, the EGM provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the EGM employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations."

In various embodiments, the EGM includes a progressive award. Typically, a progressive award includes an initial amount and an additional amount funded through a portion of each wager placed to initiate a play of a primary game. When one or more triggering events occurs, the EGM provides at least a portion of the progressive award. After the EGM provides the progressive award, an amount of the progressive award is reset to the initial amount and a portion of each subsequent wager is allocated to the next progressive award. Examples of progressive gaming systems or EGMs are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the EGM provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the EGM automatically provides or initiates the secondary game upon the occurrence of a triggering event or the satisfaction of a qualifying condition. In other embodiments, the EGM initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the EGM randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the EGM determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system or EGM includes one or more player tracking systems. Such player tracking systems enable operators of the gaming system or EGM (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the EGM to begin a gaming session, the card reader reads the player identification number off the player tracking card to identify the player. The EGM timely tracks any suitable information or data relating to the identified player's gaming session. The EGM also timely tracks when the player tracking card is removed to conclude play for that gaming session. In another embodiment, rather than requiring insertion of a player tracking card into the card reader, the EGM utilizes one or more portable devices, such as a mobile phone, a radio frequency identification tag, or any other suitable wireless device, to track when a gaming session begins and ends. In another embodiment, the EGM utilizes any suitable biometric technology or ticket technology to track when a gaming session begins and ends.

In such embodiments, during one or more gaming sessions, the EGM tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the first display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

Certain of the gaming systems described herein, including EGMs located in a casino or another gaming establishment, include certain components and/or are configured to operate in certain manners that differentiate these EGMs and systems from general purpose computing devices (i.e., certain personal gaming devices such as desktop computers and laptop computers).

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are typically not state-based machines, and a majority of data can be lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

It should further be appreciated that the EGM of the present disclosure may have varying or alternative housing configurations.

It should further be appreciated that the EGM of the present disclosure may have varying or alternative display device configurations.

In various embodiments, the EGM of the present disclosure is configured to be positioned on a base or stand.

It should be appreciated that the enhanced physical player interaction provided by the present disclosure, in addition to being implemented in an EGM configured to be located on a casino floor, can be implemented in one or more personal gaming devices, such as desktop computers, laptop computers, tablet computers or computing devices, personal digital assistants, mobile phones, and other mobile computing devices.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic gaming system comprising:
an electronic gaming machine comprising:
    a housing having a front side;
    a head position tracker supported by the housing;
    a first speaker array supported by the housing and including a plurality of first speakers, wherein the plurality of first speakers are positioned at different angles to direct sound beams at different angles relative to the front side of the housing;
    a second speaker array supported by the housing and including a plurality of second speakers, wherein the plurality of second speakers are positioned at different angles to direct sound beams at different angles relative to the front side of the housing;
    a processor; and
    a memory device that stores a plurality of instructions that, when executed, cause the processor to, for a play of a game:
        operate with the head position tracker to capture player head position information;
        identify a subset of the plurality of first speakers of the first speaker array to activate based on the captured player head position information;
        identify a subset of the plurality of second speakers of the second speaker array to activate based on the captured player head position information;
        cause the identified subset of the plurality of first speakers to output a first sound beam associated with audio associated with the play of the game; and
        cause the identified subset of the plurality of second speakers to output a second sound beam associated with audio associated with the play of the game.

2. The electronic gaming system of claim 1, wherein the plurality of instructions, when executed, cause the processor to cause the identified subset of the plurality of first speakers and the identified subset of the plurality of second speakers to simultaneously output the first sound beam and the second sound beam.

3. The electronic gaming system of claim 1,
wherein the first speaker array comprises a first subset of the plurality of first speakers associated with first player head position information and the second speaker array comprises a first subset of the plurality of second speakers associated with the first player head position information,
wherein the first speaker array comprises a second subset of the plurality of first speakers associated with second player head position information and the second speaker array comprises a second subset of the plurality of second speakers associated with the second player head position information, and
wherein the first subset of the plurality of first speakers is different than the second subset of the plurality of first speakers and the first subset of the plurality of second speakers is different than the second subset of the plurality of second speakers.

4. The electronic gaming system of claim 3, wherein the first subset of the plurality of first speakers and the second subset of the plurality of first speakers include a shared speaker.

5. The electronic gaming system of claim 1, wherein the plurality of instructions, when executed, cause the processor to:
activate the subset of the plurality of first speakers of the first speaker array by associating each of the plurality of first speakers with first respective output volumes; and
activate the subset of the plurality of second speakers of the second speaker array by associating each of the plurality of second speakers with second respective output volumes.

6. The electronic gaming system of claim 1,
wherein the first speaker array includes a first movable speaker that is movable to different positions relative to the front side of the housing and that is configured to direct sound beams at different directions relative to the front side of the housing based on the respective position of the first movable speaker, and
wherein the second speaker array includes a second movable speaker that is movable to different positions relative to the front side of the housing and that is configured to direct sound beams at different directions relative to the front side of the housing based on the respective position of the second movable speaker.

7. The electronic gaming system of claim 1, further including:
a first movable speaker that is movable to different positions relative to the front side of the housing and that is configured to direct sound beams at different directions relative to the front side of the housing based on the respective position of the first movable speaker; and
a second movable speaker that is movable to different positions relative to the front side of the housing and that is configured to direct sound beams at different directions relative to the front side of the housing based on the respective position of the second movable speaker.

8. The electronic gaming system of claim 7, wherein the first movable speaker is positioned adjacent to the first speaker array and the second movable speaker is positioned adjacent to the second speaker array.

9. The electronic gaming system of claim 1, further comprising:
a gaming chair comprising:
a headrest having a front side, the headrest comprising:
a third speaker array supported by the headrest and including a plurality of third speakers, wherein the plurality of third speakers are positioned at different angles to direct sound beams at different angles relative to the front side of the headrest; and
a fourth speaker array supported by the headrest and including a plurality of fourth speakers, wherein the plurality of fourth speakers are positioned at different angles to direct sound beams at different angles relative to the front side of the headrest; and
wherein the plurality of instructions, when executed, cause the processor to:
identify a subset of the plurality of third speakers of the third speaker array to activate based on the captured player head position information;
identify a subset of the plurality of fourth speakers of the fourth speaker array to activate based on the captured player head position information;
cause the identified subset of the plurality of third speakers to output a third sound beam associated with audio associated with the play of the game; and
cause the identified subset of the plurality of fourth speakers to output a fourth sound beam associated with audio associated with the play of the game.

10. The electronic gaming system of claim 9, wherein the plurality of instructions, when executed, cause the processor to cause the identified subset of the plurality of first speakers, the identified subset of the plurality of second speakers, the identified subset of the plurality of third speakers, and the identified subset of the plurality of fourth speakers to simultaneously output the respective first sound beam, the second sound beam, the third sound beam, and the fourth sound beam.

11. The electronic gaming system of claim 9,
wherein the third speaker array includes a first movable speaker that is movable to different positions relative to the front side of the headrest and that is configured to direct sound beams at different directions relative to the front side of the headrest based on the respective position of the first movable speaker, and
wherein the fourth speaker array includes a second movable speaker that is movable to different positions relative to the front side of the headrest and that is configured to direct sound beams at different directions relative to the front side of the headrest based on the respective position of the second movable speaker.

12. The electronic gaming system of claim 9, wherein the headrest further comprises:
a first movable speaker that is movable to different positions relative to the front side of the headrest and that is configured to direct sound beams at different directions relative to the front side of the headrest based on the respective position of the first movable speaker; and
a second movable speaker that is movable to different positions relative to the front side of the headrest and that is configured to direct sound beams at different directions relative to the front side of the headrest based on the respective position of the second movable speaker.

13. The electronic gaming system of claim 12, wherein the first movable speaker is positioned adjacent to the third speaker array and the second movable speaker is positioned adjacent to the fourth speaker array.

14. The electronic gaming system of claim 1, further comprising:
- a gaming chair comprising:
  - a headrest having a front side, the headrest comprising:
    - a first movable speaker supported by the housing, wherein the first movable speaker is movable to different positions relative to the front side of the headrest and configured to direct sound beams at different directions relative to the front side of the headrest based on the respective position of the first movable speaker; and
    - a second movable speaker supported by the housing, wherein the second movable speaker is movable to different positions relative to the front side of the headrest and configured to direct sound beams at different directions relative to the front side of the headrest based on the respective position of the second movable speaker; and
  - wherein the plurality of instructions, when executed, cause the processor to:
    - identify a direction of the first movable speaker to direct sound beams based on the captured player head position information;
    - identify a direction of the second movable speaker to direct sound beams based on the captured player head position information;
    - cause the first movable speaker to move to a position relative to the front side of the headrest based on the identified direction of the first movable speaker;
    - cause the second movable speaker to move to a position relative to the front side of the headrest based on the identified direction of the second movable speaker;
    - cause the first movable speaker to output a third sound beam associated with audio associated with the play of the game; and
    - cause the second movable speaker to output a fourth sound beam associated with audio associated with the play of the game.

15. An electronic gaming system comprising:
an electronic gaming machine comprising:
- a housing having a front side;
- a head position tracker supported by the housing;
- a first speaker supported by the housing, wherein the first speaker is movable to different positions relative to the front side of the housing and configured to direct sound beams at different directions relative to the front side of the housing based on the respective position of the first speaker;
- a second speaker supported by the housing, wherein the second speaker is movable to different positions relative to the front side of the housing and configured to direct sound beams at different directions relative to the front side of the housing based on the respective position of the second speaker;
- a processor; and
- a memory device that stores a plurality of instructions that, when executed, cause the processor to, for a play of a game:
  - operate with the head position tracker to capture player head position information;
  - identify a direction of the first speaker to direct sound beams based on the captured player head position information;
  - identify a direction of the second speaker to direct sound beams based on the captured player head position information;
  - cause the first speaker to move to a position relative to the front side of the housing based on the identified direction of the first speaker;
  - cause the second speaker to move to a position relative to the front side of the housing based on the identified direction of the second speaker;
  - cause the first speaker to output a first sound beam associated with audio associated with the play of the game; and
  - cause the second speaker to output a second sound beam associated with audio associated with the play of the game.

16. The electronic gaming system of claim 15, wherein the plurality of instructions, when executed, cause the processor to cause the first speaker and the second speaker to simultaneously output the first sound beam and the second sound beam.

* * * * *